US 7,275,039 B2

(12) United States Patent
Setteducati

(10) Patent No.: US 7,275,039 B2
(45) Date of Patent: Sep. 25, 2007

(54) WORKFLOW MANAGEMENT SOFTWARE OVERVIEW

(76) Inventor: Michael Setteducati, 330 Grand St., Apt. #404, Hoboken, NJ (US) 07030-2713

( * ) Notice: Subject to any disclaimer, the term of this patent is extended or adjusted under 35 U.S.C. 154(b) by 489 days.

(21) Appl. No.: 10/381,662

(22) PCT Filed: Oct. 2, 2001

(86) PCT No.: PCT/US01/30837

§ 371 (c)(1),
(2), (4) Date: Mar. 26, 2003

(87) PCT Pub. No.: WO02/29515

PCT Pub. Date: Apr. 11, 2002

(65) Prior Publication Data

US 2004/0039623 A1    Feb. 26, 2004

Related U.S. Application Data

(60) Provisional application No. 60/237,827, filed on Oct. 3, 2000.

(51) Int. Cl.
*G06F 9/46* (2006.01)
(52) U.S. Cl. .......................... 705/8; 718/102; 718/103
(58) Field of Classification Search ................. 705/8, 705/9; 718/102, 103
See application file for complete search history.

(56) References Cited

U.S. PATENT DOCUMENTS 5,187,789 A    2/1993    O'Hair .................. 395/700

5,295,222 A    3/1994    Wadhwa et al. ............ 395/1

(Continued)

FOREIGN PATENT DOCUMENTS

EP    0793184 A2 *   3/1996
WO   WO9429804 A1 *  12/1994

OTHER PUBLICATIONS

Van der Aalst; "The Application of Petri Nets to Workflow Management", 1998, The Journal of Circuits, Systems, and Computers, pp. 1-53.*

(Continued)

*Primary Examiner*—Romain Jeanty
(74) *Attorney, Agent, or Firm*—Sofer & Haroun, LLP

(57) ABSTRACT

A workflow management system and method for managing an operation on a population of entities, comprises the steps of storing a set of events expected to occur during the operation in a workflow rules table (140) and storing a set of dispositions in the same rules table (140), wherein each of said dispositions represents a status corresponding to an entity. The method also includes the step of correlating by a dispositioner (260) each of said events with at least one disposition and determining disposition of each of said entities in response to occurrence of one of said expected events. In accordance with another embodiment of the invention, the method further comprises the step of setting at least one of the dispositions as a pause indicating that an entity is in a waiting status. The method also comprises the step of setting at least one of said dispositions as a task indicating that an entity requires a work to be performed. The values corresponding to most recent event and most recent dispositions for each one of said entities is stored in an event disposition storage unit (290).

41 Claims, 27 Drawing Sheets

U.S. PATENT DOCUMENTS

| | | | | |
|---|---|---|---|---|
| 5,490,097 | A | | 2/1996 | Swenson et al. ............. 364/578 |
| 5,581,691 | A | | 12/1996 | Hsu et al. .............. 395/182.13 |
| 5,630,069 | A | | 5/1997 | Flores et al. ................. 395/400 |
| 5,745,687 | A | | 4/1998 | Randell ....................... 395/200 |
| 5,802,527 | A | | 9/1998 | Brechtel et al. ............ 707/200 |
| 5,848,393 | A | * | 12/1998 | Goodridge et al. ............. 705/8 |
| 5,870,545 | A | * | 2/1999 | Davis et al. ................. 709/201 |
| 5,933,828 | A | | 8/1999 | Eitel et al. ..................... 707/10 |
| 5,937,410 | A | | 8/1999 | Shen .......................... 707/103 |
| 5,940,829 | A | * | 8/1999 | Tsuiki et al. .................... 707/10 |
| 5,950,169 | A | | 9/1999 | Borghesi et al. ................ 705/4 |
| 5,960,420 | A | | 9/1999 | Laymann et al. .............. 707/1 |
| 5,974,392 | A | | 10/1999 | Endo .............................. 705/8 |
| 5,999,911 | A | * | 12/1999 | Berg et al. ...................... 705/9 |
| 6,018,627 | A | | 1/2000 | Lyengar et al. ............. 395/701 |
| 6,023,578 | A | | 2/2000 | Birsan ........................ 395/702 |
| 6,073,109 | A | | 6/2000 | Flores ............................ 705/8 |
| 6,091,895 | A | | 7/2000 | Govindaraj ................. 395/702 |
| 6,144,955 | A | | 11/2000 | Tsuiki et al. .................... 707/1 |
| 6,182,024 | B1 | | 1/2001 | Gangopadhy ................ 703/22 |
| 6,182,274 | B1 | | 1/2001 | Lau ................................ 717/1 |
| 6,212,672 | B1 | | 4/2001 | Keller et al. ................... 717/1 |
| 6,226,792 | B1 | | 5/2001 | Goiffon et al. ............... 717/11 |
| 6,233,537 | B1 | | 5/2001 | Gryphon et al. ............... 703/1 |
| 6,308,163 | B1 | * | 10/2001 | Du et al. ........................ 705/8 |
| 6,349,287 | B1 | | 2/2002 | Hayashi ......................... 705/8 |
| 6,401,073 | B1 | * | 6/2002 | Tokuda et al. ................. 705/8 |
| 6,424,948 | B1 | * | 7/2002 | Dong et al. .................... 705/9 |
| 6,501,176 | B2 | * | 12/2002 | Jackson ..................... 257/738 |
| 6,697,784 | B2 | * | 2/2004 | Bacon et al. ................... 705/9 |
| 6,976,257 | B2 | * | 12/2005 | Leymann et al. ........... 718/103 |
| 7,024,670 | B1 | * | 4/2006 | Leymann et al. ........... 718/102 |
| 7,027,997 | B1 | * | 4/2006 | Robinson et al. ............... 705/9 |
| 7,065,493 | B1 | * | 6/2006 | Homsi ............................ 705/8 |
| 2002/0040312 | A1 | | 4/2002 | Dhar et al. ..................... 705/8 |

OTHER PUBLICATIONS

Michael "Workflow automation software: Go with the flow. (includes related articles on Editors' choices suitability to task ratings, highlights) (Software Review) the Changing Office) (overview of 11 evaluations of workflow automation software) Evaluation"; Jun. 1994; PC Magazine, v13, n11, p253(26); Dialog file 275, Accession No. 01683358.*

Dialog "Business process and workflow : where technology and management come together. (Florida conference report) (Industry Trend or event)"; Feb. 1996; Computer Conference Analysis Newsletter, n380, p1(1); Dialog file 275, Accession No. 01910340.*

Carlsen "Evaluating Flexible Workflow Systems", Dec. 1997, Computet Society, pp. 1-10.*

International Preliminary Examination Report dated May 2, 2002.
International Search Report dated May 22, 2002.

* cited by examiner

FIG. 1 (SHEET 1)

FIG. 1 (SHEET 2)

| ID | WFTR | TYPE | SUB-TYPE | TEXT | SPECIFICATION | PTR1 | PTR2 |
|----|------|------|----------|------|---------------|------|------|
| 1 | 1 | EVENT | | INITIAL BILL DROP | IBD | 2 | |
| 2 | 1 | DISP | | ACCOUNTS AWAITING PAYMENT | AAP | 4 | |
| 3 | 1 | EVENT | | PAYMENT | PMT | | |
| 4 | 1 | DISP | | ACCOUNTS WITH A BALANCE AFTER A PAYMENT | ABAP | 6 | |
| 5 | 1 | EVENT | | DENIAL | DEN | | |
| 6 | 1 | DISP | | ACCOUNTS WHERE PAYMENT WAS DENIED | APD | | |

FIG. 2A

| ID | WFTR | TYPE | SUB-TYPE | TEXT | SPECIFICATION | PTR1 | PTR2 |
|----|------|------|----------|------|---------------|------|------|
| 1 | 1 | EVENT | | INITIAL BILL DROP | IBD | 2 | |
| 2 | 1 | CONN | COND | FOLLOW-UP LIMIT REACHED? | ELAPSED DAYS>25 | 3 | 4 |
| 3 | 1 | DISP | TASK | BILL FOLLOW-UP | | | |
| 4 | 1 | DISP | PAUSE | ACCOUNTS AWAITING PAYMENT | AAP | 4 | |
| 5 | 1 | EVENT | | PAYMENT | PMT | | |
| 6 | 1 | DISP | TASK | ACCOUNTS WITH A BALANCE AFTER A PAYMENT | ABAP | 6 | |
| 7 | 1 | EVENT | | DENIAL | DEN | | |
| 8 | 1 | DISP | TASK | ACCOUNTS WHERE PAYMENT WAS DENIED | APD | | |

FIG. 2B

| ID | WFTR | TYPE | SUB-TYPE | TEXT | SPECIFICATION | PTR1 | PTR2 |
|---|---|---|---|---|---|---|---|
| 1 | 1 | EVENT | | INITIAL BILL DROP-ELECTRONIC | | 2 | |
| 2 | 1 | CONN | CONN | BEL | BDIE%Q=N%W=N | 3 | |
| 3 | 1 | VAR | | WAIT | BEL | 4 | |
| 4 | 1 | CONN | COND | 60 DAYS SINCE ORIGINALLY BILLED? | 21 TODAY-ORIG_BILL_DT>60 | 5 | 7 |
| 5 | 1 | CONN | COND | CURRENT PAYOR COMMERCIAL OR BLUE CROSS? | INLIST (PAYOR,"C","B") | 6 | 7 |
| 6 | 1 | CONN | TR PTR | PA (PALT) | PA (PALT) | 128 | 7 |
| 7 | 1 | CONN | COND | ELAPSED_DAYS>=WAIT | ELAPSED DAYS>=WAIT | 8 | 30 |
| 8 | 1 | DISP | TASK | BILL FOLLOW-UP | BF%Q=Y,QT=PTFC% PATIENT_TYPEII"."|| FINANCIAL-CLASS% DESCENDING(BALANCE) %9,13,15,19,23,25% OE=N | | |
| 9 | 1 | EVENT | | NEW FOLLOW-UP REQUIRED | NFR%Q=N%W=Y,1,21 | 10 | |
| 10 | 1 | CONN | PTR | USR | USR | 11 | |
| 11 | 1 | CONN | CONN | USR | USR | 12 | |
| 12 | 1 | VAR | | WAIT | EVENT WAIT | 4 | |
| 13 | 1 | EVENT | | REBILLED ACCOUNT -ELECTRONIC | BDRE%Q=N%W=N | 14 | |
| 14 | 1 | CONN | PTR | BEL | BEL | 2 | |
| 15 | 1 | EVENT | | REBILLED ACCOUNT -HARDCOPY | BDRH%Q=N%W=N | 16 | |

2C (SHEET 1)

| ID | WFTR | TYPE | SUB-TYPE | TEXT | SPECIFICATION | PTR1 | PTR2 |
|----|------|------|----------|------|---------------|------|------|
| 16 | 1 | CONN | PTR | BHC | BHC | 17 | |
| 17 | 1 | CONN | CONN | BHC | BHC | 18 | |
| 18 | 1 | VAR | | WAIT | 28 | 4 | |
| 19 | 1 | EVENT | | BILLING REQUIRED (NEXT PAYOR) | BR%Q=Y,QT=INTP%W=N | 20 | |
| 20 | 1 | CONN | PTR | BA | BA | 21 | |
| 21 | 1 | CONN | CONN | BA | BA | 22 | |
| 22 | 1 | DISP | TASK | BILL ACCOUNT | BF%Q=Y, PATIENT_TYPE%";"∥ EVENT_QUALIFIER %DESCENDING(BALANCE) %13,15,19,23,19,25% OE=N | | |
| 23 | 1 | EVENT | | BALANCE IS SELF PAY | SP%Q=N%W=N | 24 | |
| 24 | 1 | CONN | PTR | SP (SP) | SP (SP) | 76 | |
| 25 | 1 | EVENT | | BILLING ISSUES | ISSU%Q=Y, QT=USER%W=N | 26 | |
| 26 | 1 | CONN | PTR | BI | BI | 27 | |
| 27 | 1 | CONN | CONN | BI | BI | 28 | |
| 28 | 1 | DISP | TASK | MGR REV-BILLING ISSUES | MRBI%Q=Y, QT=USER%EVENT _QUALIFIER %EVENT-DATE %13,15,23,19%OE=Y | | |
| 29 | 1 | EVENT | | INITIAL BILL DROP- HARDCOPY | BDIH%Q=N%W=N | 17 | |

FIG. 2C (SHEET 2)

| ID | WF | TR | TYPE | SUB-TYPE | TEXT | SPECIFICATION | PTR1 | PTR2 |
|---|---|---|---|---|---|---|---|---|
| 30 | 1 | 1 | DISP | PAUSE | AWAITING PAYMENT | AP%Q=Y, QT=PTFC%PATIENT_TYPEII"_FINANCIAL_CLASS% | | |
| 31 | 1 | 1 | CONN | TR CONN | PPI | PPI%W=1 | | |
| 32 | 1 | 1 | EVENT | | ACCOUNT REINSTATED | AR%Q=N%W=N | 22 | |
| 33 | 1 | 1 | DISP | TASK | REVIEW REINSTATEMENT | RR%Q=Y, QT=PT%PATIENT_TYPE%OE=Y | 33 | |

2C (SHEET 3)

| ID | WFTR | TYPE | SUB-TYPE | TEXT | SPECIFICATION | PTR1 | PTR2 |
|----|------|------|----------|------|---------------|------|------|
| 76 | 1 | CONN | CONN | SP | SP | 77 | |
| 77 | 1 | CONN | CASE | BALANCE<5 | BALANCE<5 | 80 | 78 |
| 78 | 1 | CONN | CASE | BALANCE>200 | BALANCE>200 | 81 | 79 |
| 79 | 1 | CONN | CASE | OTHERWISE | OTHERWISE | 82 | |
| 80 | 1 | CONN | DIAGRAM | WRITE-OFF | WOFF | 102 | |
| 81 | 1 | DISP | PROCESS | MEDICAID MATCH | MM%Q=N | 85 | |
| 82 | 1 | CONN | CONN | CSP | CSP | 83 | |

FIG. 2D

| ID | WFTR | TYPE | SUB-TYPE | TEXT | SPECIFICATION | PTR1 | PTR2 |
|----|------|------|----------|------|---------------|------|------|
| 128 | 2 | CONN | TR CONN | PA | PA%W=-1 | 129 | |
| 129 | 2 | DISP | DOC | PATIENT ASSISTANCE LETTER 1 | PAL1%Q=N %% | 130 | |
| 130 | 2 | EVENT | | PA LETTER 1 GENERATED | PAL1%Q=N%W=N | 131 | |
| 131 | 2 | CONN | COND | ELAPSED_DAYS>30 | ELAPSED_DAYS>30 | 132 | 133 |
| 132 | 2 | DISP | PAUSE | AWAITING PA LETTER 1 | APL1%Q=N %% | | |
| 133 | 2 | DISP | DOC | PATIENT ASSISTANCE LETTER 2 | PAL2%Q=N %% | 134 | |
| 134 | 2 | EVENT | | PA LETTER 2 GENERATED | PAL2%Q=N%W=N | 135 | |
| 135 | 2 | CONN | COND | ELAPSED_DAYS>30 | ELAPSED_DAYS>30 | 136 | 137 |
| 136 | 2 | DISP | PAUSE | AWAITING PA LETTER 2 | APL2%Q=N %% | | |
| 137 | 2 | DISP | STOP | END PA LETTER SERIES | EPAL%Q=N %% | | |

FIG. 2E

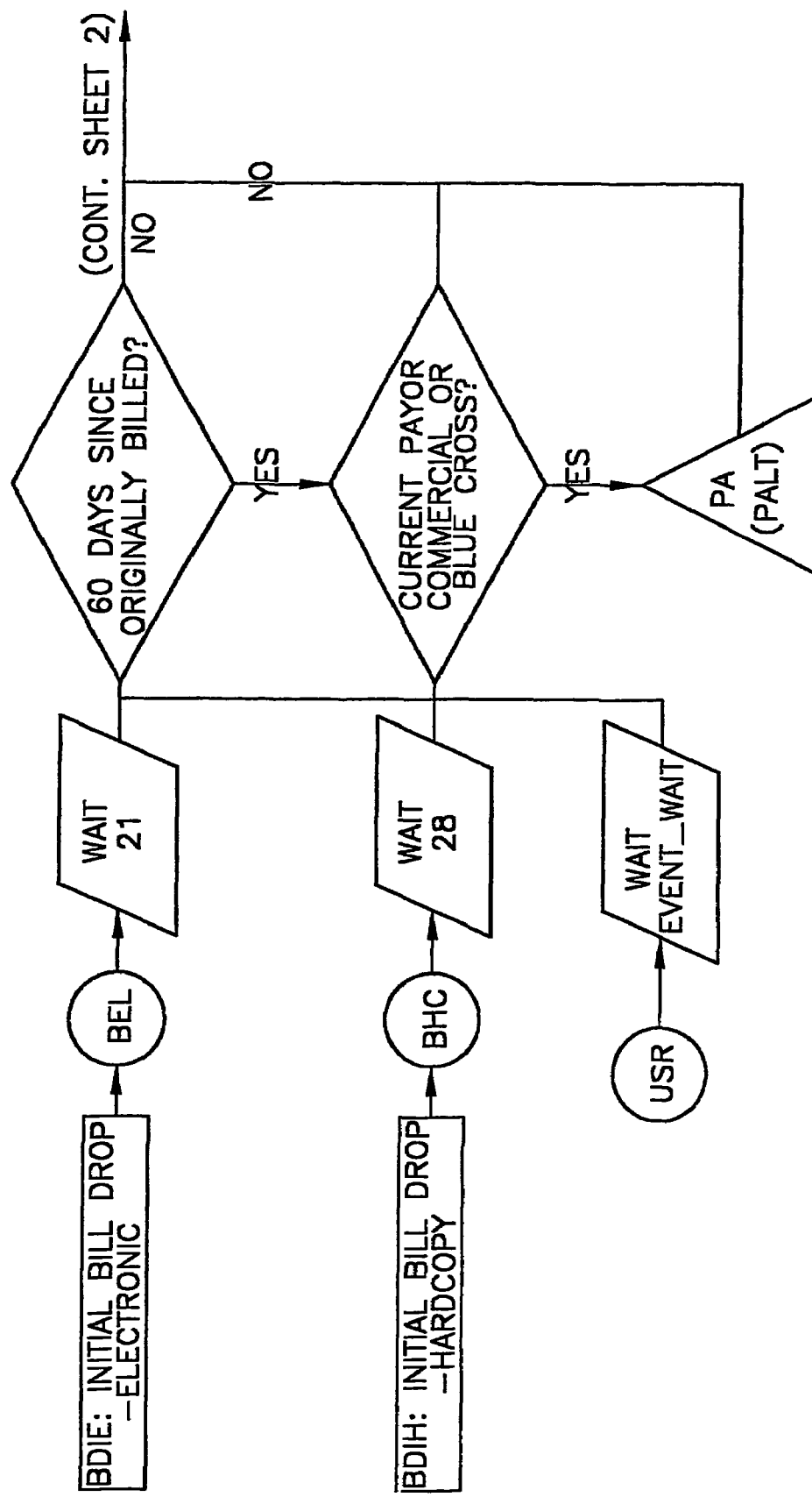
FIG. 5 (SHEET 1)

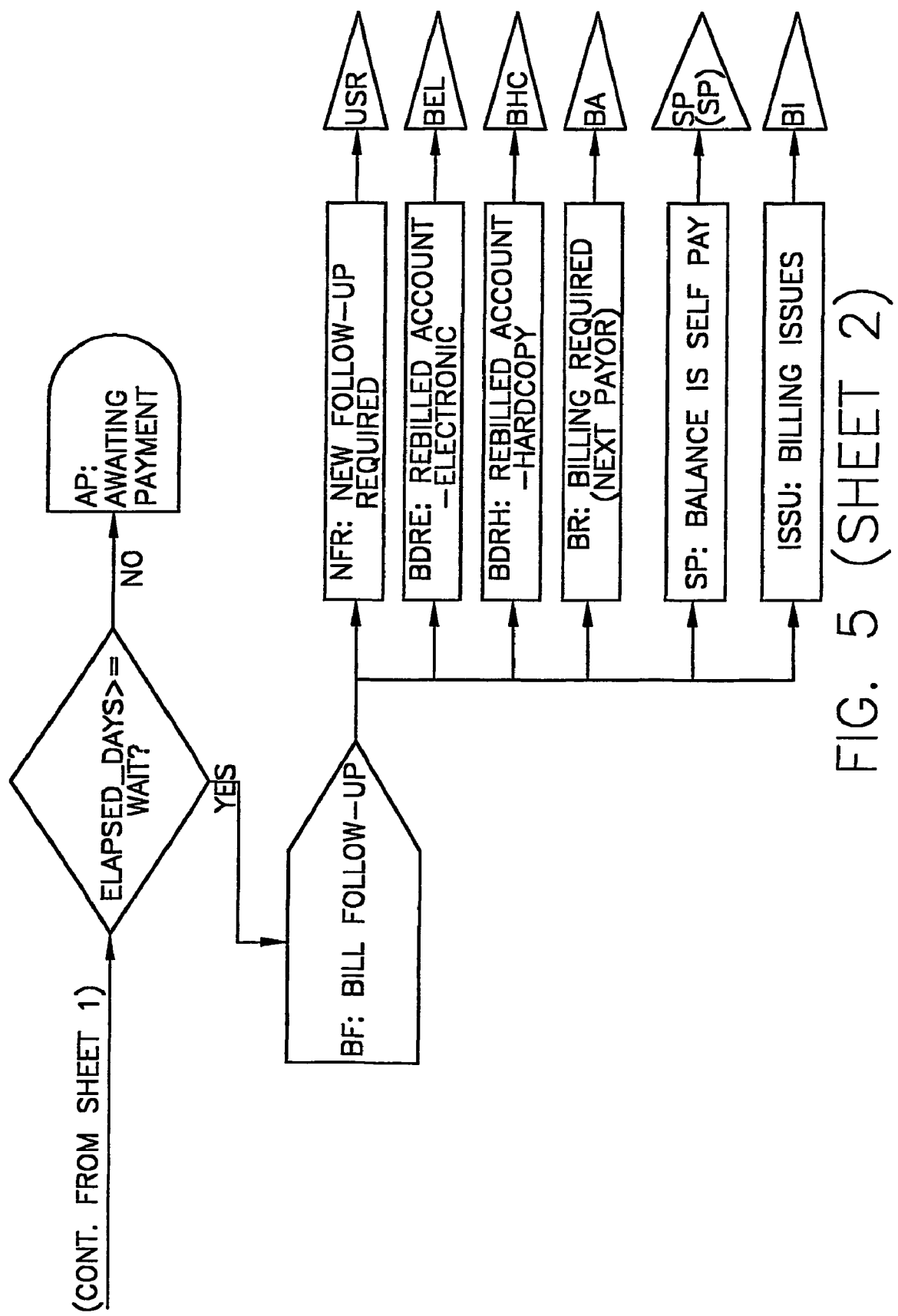
FIG. 5 (SHEET 2)

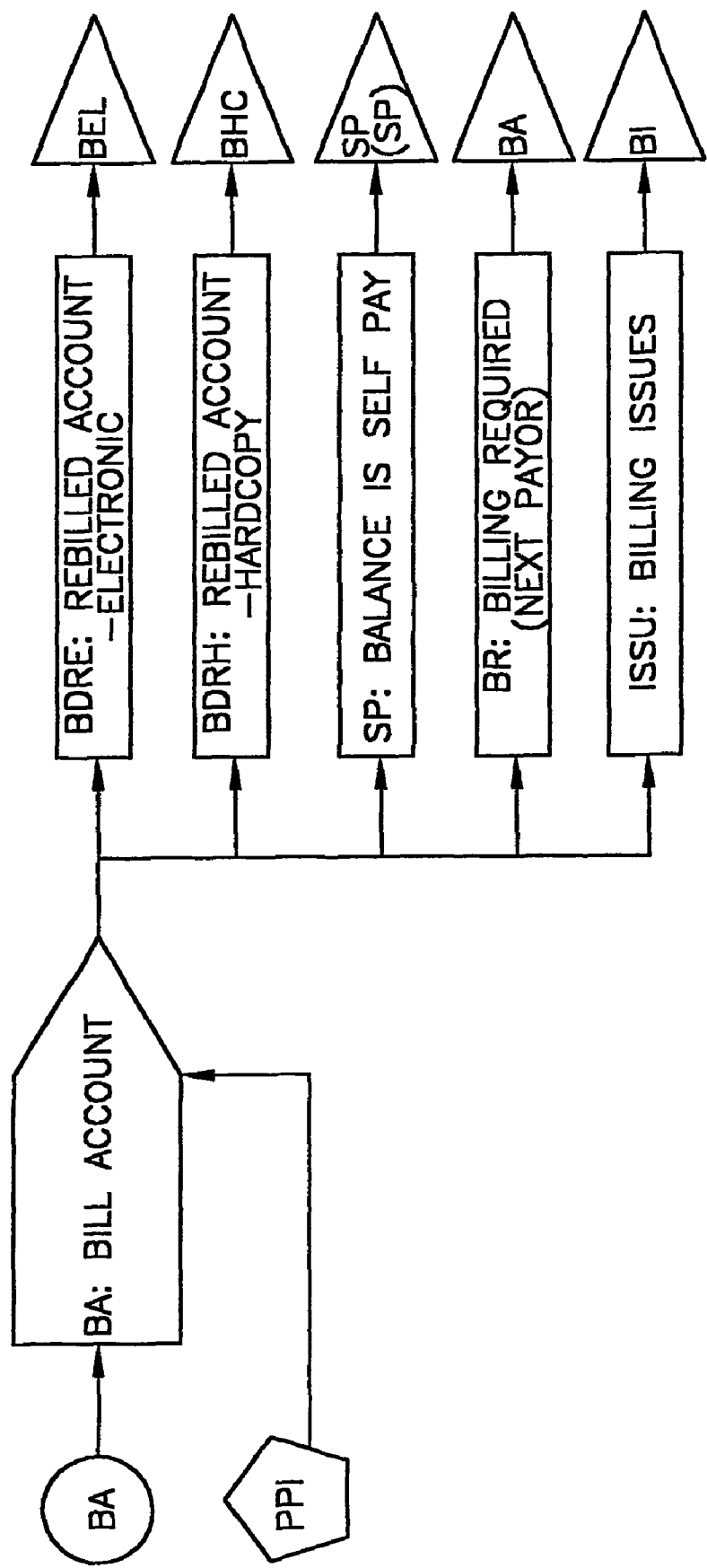
FIG. 5 (SHEET 3)

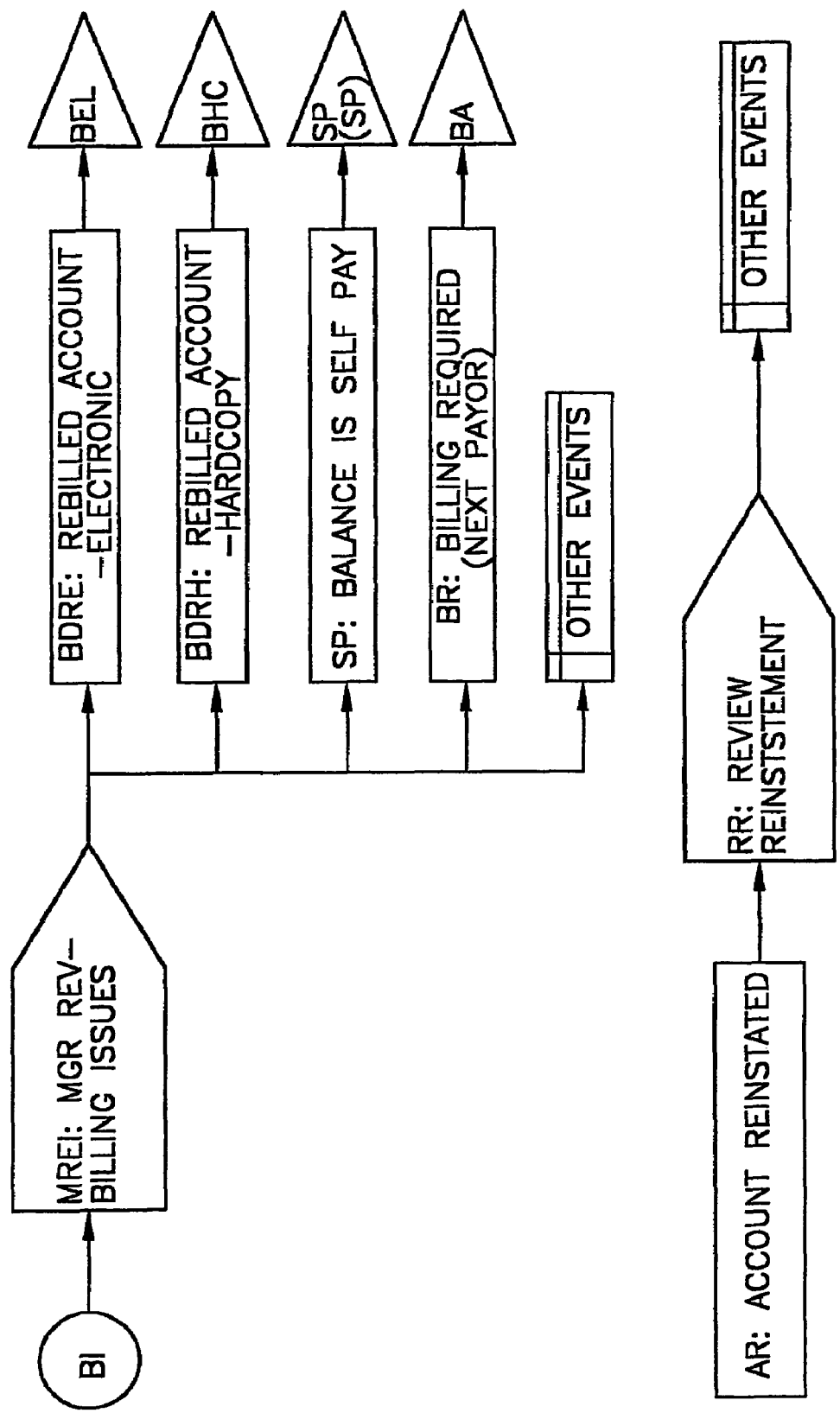
FIG. 5 (SHEET 4)

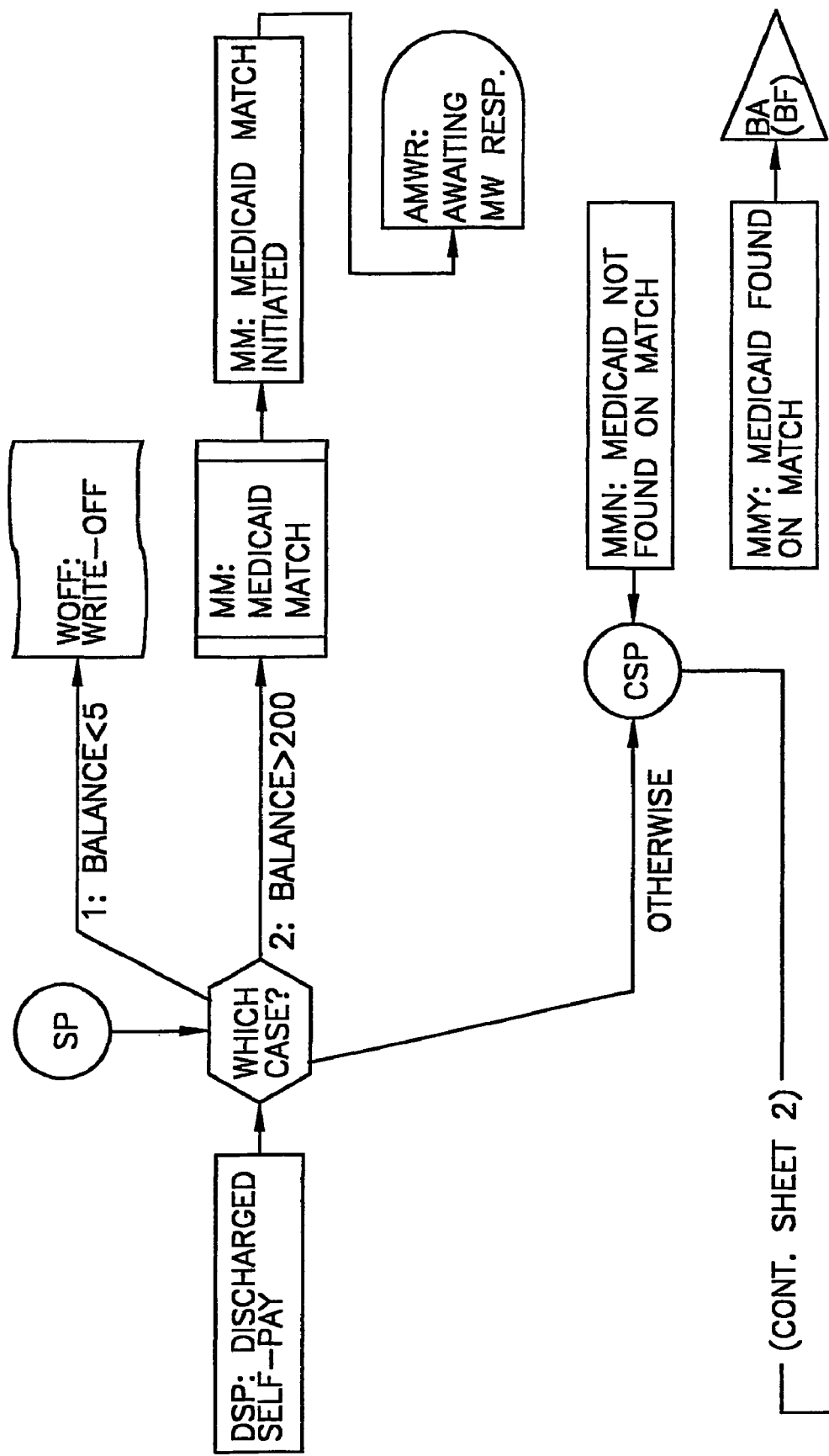
FIG. 7 (SHEET 1)

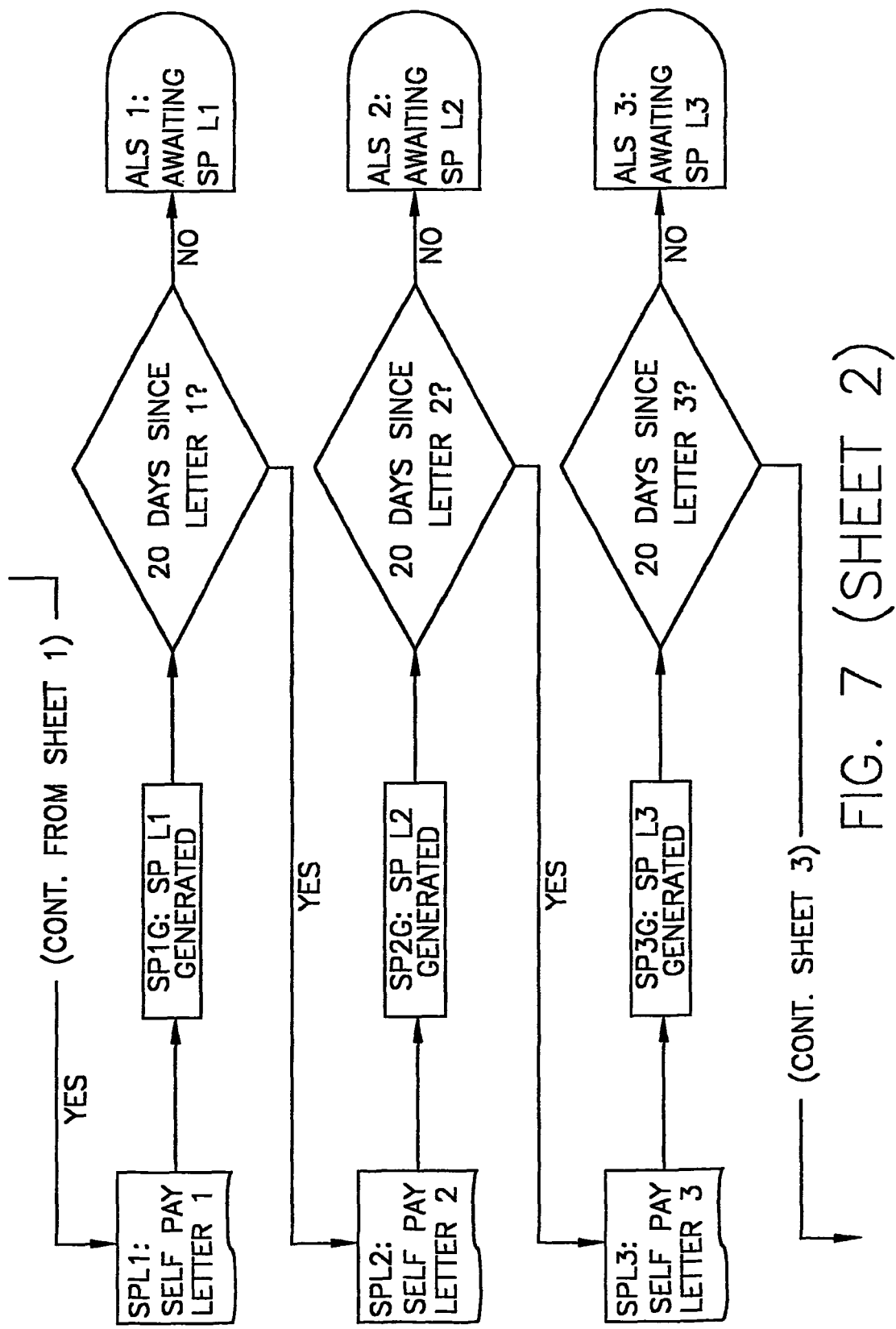
FIG. 7 (SHEET 2)

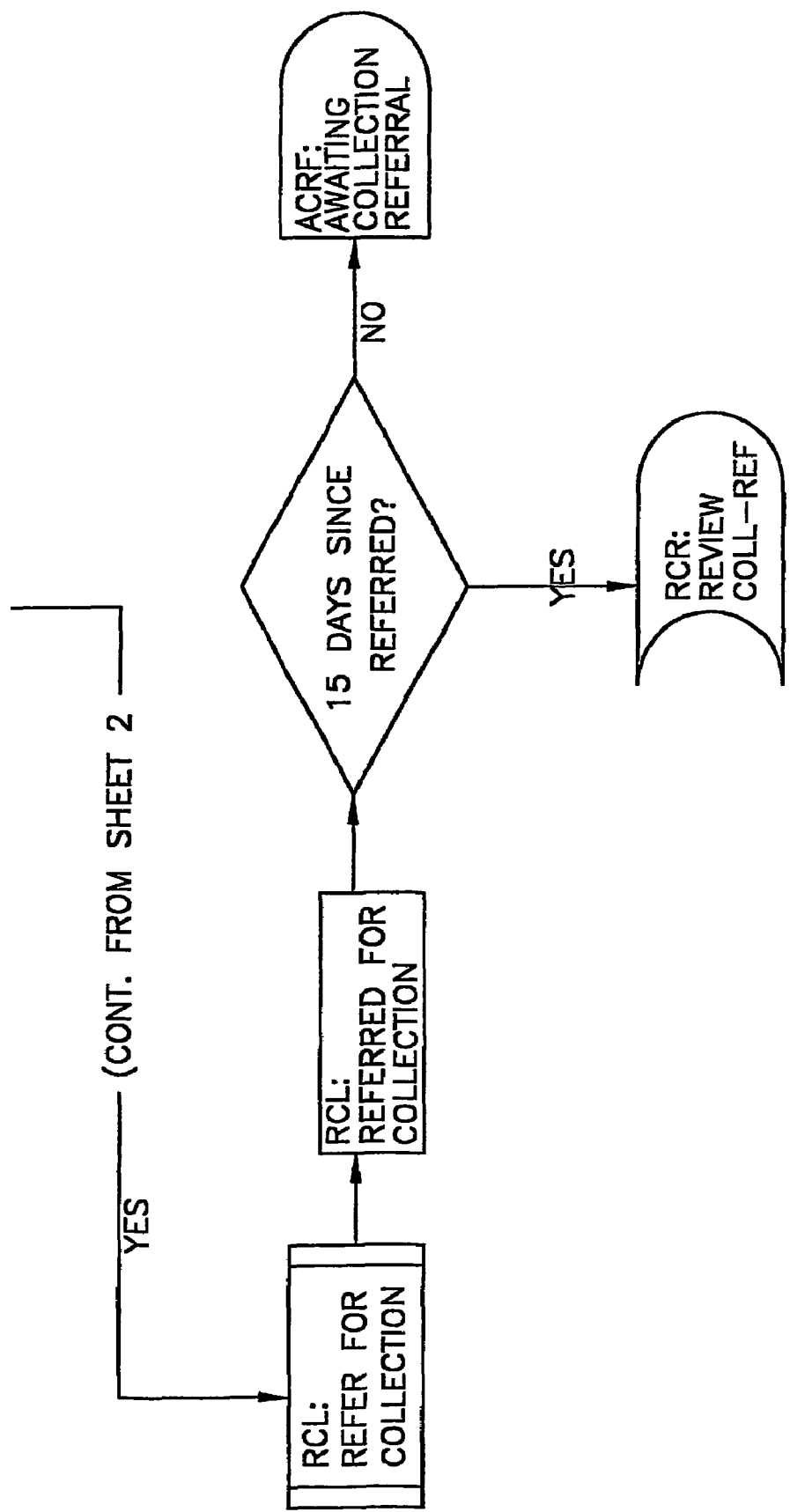
FIG. 7 (SHEET 3)

ACCOUNTS RECEIVABLE PROFILE
ABC GENERAL HOSPITAL
A/R PROFILE BY PATIENT TYPE AND FINANCIAL CLASS

| PATIENT-TYPE | FINANCIAL-CLASS | #-ACCTS | AVERAGE BALANCE | TOTAL BALANCE |
|---|---|---|---|---|
| INPATIENT | MEDICAID | 195 | 10,831.13 | 2,112,069.44 |
| | COMMERCIAL | 150 | 7,803.14 | 1,170,471.02 |
| | HMO | 289 | 8,441.08 | 2,439,472.84 |
| | MEDICARE | 193 | 7,297.77 | 1,408,469.75 |
| | SELF PAY | 128 | 12,807.71 | 1,639,386.44 |
| INPATIENT TOTAL | | 955 | 9,183.11 | 8,769,869.49 |
| → OUTPATIENT | MEDICAID | 1,084 | 848.15 | 919,395.66 |
| | COMMERCIAL | 689 | 607.44 | 418,526.18 |
| | HMO | 1,653 | 601.22 | 993,816.22 |
| | MEDICARE | 1,041 | 695.70 | 724,228.88 |
| | SELF PAY | 710 | 1,163.60 | 826,154.98 |
| OUTPATIENT TOTAL | | 5,177 | 749.88 | 3,882,121.92 |
| TOTAL WORKFLOW (IN & OUT) | | 6,132 | 2,063.27 | 12,651,991.41 |

FIG. 15

WORKFLOW DISPOSITION ANALYSIS
ABC GENERAL HOSPITAL
DISPOSITION ANALYSIS FOR OUTPATIENT MEDICAID ACCOUNTS

| DISPOSITION TYPE | CODE: | DISPOSITION | QUAL-CODE | QUALIFIER | #-ACCOUNTS | AVERAGE BALANCE | TOTAL BALANCE |
|---|---|---|---|---|---|---|---|
| ALERT | LEOB: | LOCATE EOB | O:M | OP: MEDICAID | 5 | 1,266.27 | 6,331.35 |
| ALERT TOTAL | | | | | 5 | | |
| PAUSE | AEOB: | AWAITING EOB WORK | O:M | OP: MEDICAID | 29 | 1,164.14 | 33,759.96 |
| | AP: | AWAITING PAYMENT | O:M | OP: MEDICAID | 308 | 1,079.14 | 332,376.51 |
| | AP: | AWAITING PAYMENT | O:R | OP: MEDICAID | 161 | 421.34 | 67,835.45 |
| | AP: | AWAITING PAYMENT | O:H | OP: HMO | 43 | 1,252.39 | 53,852.95 |
| | AWO: | AWAITING WRITE-OFF | | | 2 | 20.77 | 41.54 |
| PAUSE TOTAL | | | | | 543 | | |

FIG. 16 (SHEET 1)

WORKFLOW DISPOSITION ANALYSIS
ABC GENERAL HOSPITAL
DISPOSITION ANALYSIS FOR OUTPATIENT MEDICAID ACCOUNTS

| DISPOSITION TYPE | CODE: | DISPOSITION | QUAL-CODE | QUALIFIER | #-ACCOUNTS | AVERAGE BALANCE | TOTAL BALANCE |
|---|---|---|---|---|---|---|---|
| TASKS SCHEDULED | BA: | BILL ACCOUNT | O:M | OP: MEDICAID | 148 | 1,135.41 | 168,041.21 |
| | BA: | BILL ACCOUNT | O:H | OP: HMO | 163 | 410.39 | 66,893.92 |
| | BF: | BILL FOLLOW-UP | O:M | OP: MEDICAID | 129 | 1,136.53 | 146,611.94 |
| | BF: | BILL FOLLOW-UP | O:H | OP: HMO | 79 | 374.50 | 29,585.61 |
| | WO: | WRITE-OFF ACCOUNT (MANUAL) | | | 15 | 934.75 | 14,021.31 |
| | RR: | REVIEW REINSTATEMENT | | | 2 | 21.96 | 43.91 |
| | | | | | 536 | | |
| TASK TOTAL | | | | | 1,084 | | 919,395.66 |

FIG. 16 (SHEET 2)

WORKFLOW MANAGEMENT SOFTWARE OVERVIEW

RELATED APPLICATIONS

This application claims the priority benefit of a prior U.S. Provisional Application Ser. No. 60/237,827, filed Oct. 3, 2000, entitled WORKFLOW MANAGEMENT METHODOLOGY AND SOFTWARE, and incorporated herein by reference in its entirety.

BACKGROUND OF THE INVENTION

Recently, there has been an increasing effort and activity to automate workflow processes in office environments. Typically, workflow management tools define workflow primarily in terms of tasks and roles.

Such tools, often include a visual diagramming tool that allows the user to specify these tasks and roles, from the beginning of a project to its end. Thus, a user can define a diagram with a plurality of symbols or diagram "nodes" to represent work functions in an organization, and to map the flow of documents or other work from one function to the next. This conventional approach may be easy for end-users to relate to, since each user's respective function can be easily located on the diagram. However, one problem with this workflow tools is that the workflow from or to a given function tends to get very complex. Routing iterations, status changes, and the effects of external events or operations can get too cumbersome to account for and even represent visually.

Furthermore, the prior workflow management tools do not provide mechanisms to ensure that work assignments are concluded without falling through the cracks.

Another disadvantage with prior art systems is that users who design the workflow are not enabled to iteratively refine the process until an optimal workflow is achieved. Typically, a workflow has to be worked out at the outset and provided to the workflow tool. To this end, it is very difficult, if not impossible, to detect errors in the workflow rules defined by such systems.

Thus, there is a need for a workflow management system and method that enables users to efficiently and easily create workflows that can be iteratively refined and revised.

OBJECTS AND SUMMARY OF THE INVENTION

Thus it is an object of the invention to provide a workflow system that ensures no work can "fall through the cracks."

It is another object of the invention to provide a workflow system that supports an always up-to-date status-of the operation being managed.

It is still a further object of the invention to provide a workflow system that provides an audit trail of work performed.

It is also an object of the invention to provide a workflow system that facilitates monitoring and managing productivity.

Another object of the invention is to provide a workflow system that enables users to "model" workflow through an iterative refinement process.

A further object of the invention is to provide a workflow system that allows errors in the workflow rules to be easily detected.

It is still a further object of the invention to provide a workflow system that substantially ensures "optimal efficiency" in a desired operation.

It is also an object of the invention to provide a workflow system that enables users to visually represent a workflow by implementing a powerful and simple diagramming method.

It is also an object of the invention to provide a workflow system that can be directly controlled by a diagramming software tool which adheres to the diagramming method, and which captures the rules as specified by a user implementing the workflow method.

Another object of the invention is to provide a workflow system that facilitates awareness and training of operational procedures by end-users.

These and other objects of the invention as will be more clearly understood from the following descriptions of the drawings are achieved in accordance with one embodiment of the invention, by providing a workflow management method for managing an operation on a population of entities, comprising the steps of storing a set of events expected to occur during the operation and storing a set of dispositions, wherein each of said dispositions represents a status corresponding to an entity. The method also includes the step of correlating each of said events with at least one dispostion and determining disposition of each of said entities in response to occurrence of one of said expected events.

In accordance with another embodiment of the invention, the method further comprises the step of setting at least one of the dispositions as a pause indicating that an entity is in a waiting status. The method also comprises the step of setting at least one of said dispositions as a task indicating that an entity requires a work to be performed. The values corresponding to most recent events and most recent dispositions for each one of said entities is stored in an event and disposition storage unit.

The method in accordance with another embodiment of the invention includes a diagramming module that enables users to create a workflow rule table by employing a visual user interface. A set of symbols employed by the user represents various entries in the workflow rule table.

BRIEF DESCRIPTION OF THE DRAWINGS

FIG. 5 illustrates a workflow diagram for a hospital billing system prepared by a user of workflow system in accordance with one embodiment of the invention.

FIG. 7 illustrates a workflow diagram in response to a self pay event in accordance with one embodiment of the invention.

FIG. 15 illustrates a report generated by workflow system in accordance with one embodiment of the invention.

FIG. 16 illustrates a workflow disposition analysis report generated by workflow system in accordance with one embodiment of the invention.

DETAILED DESCRIPTION OF THE DRAWINGS

Figure 1:
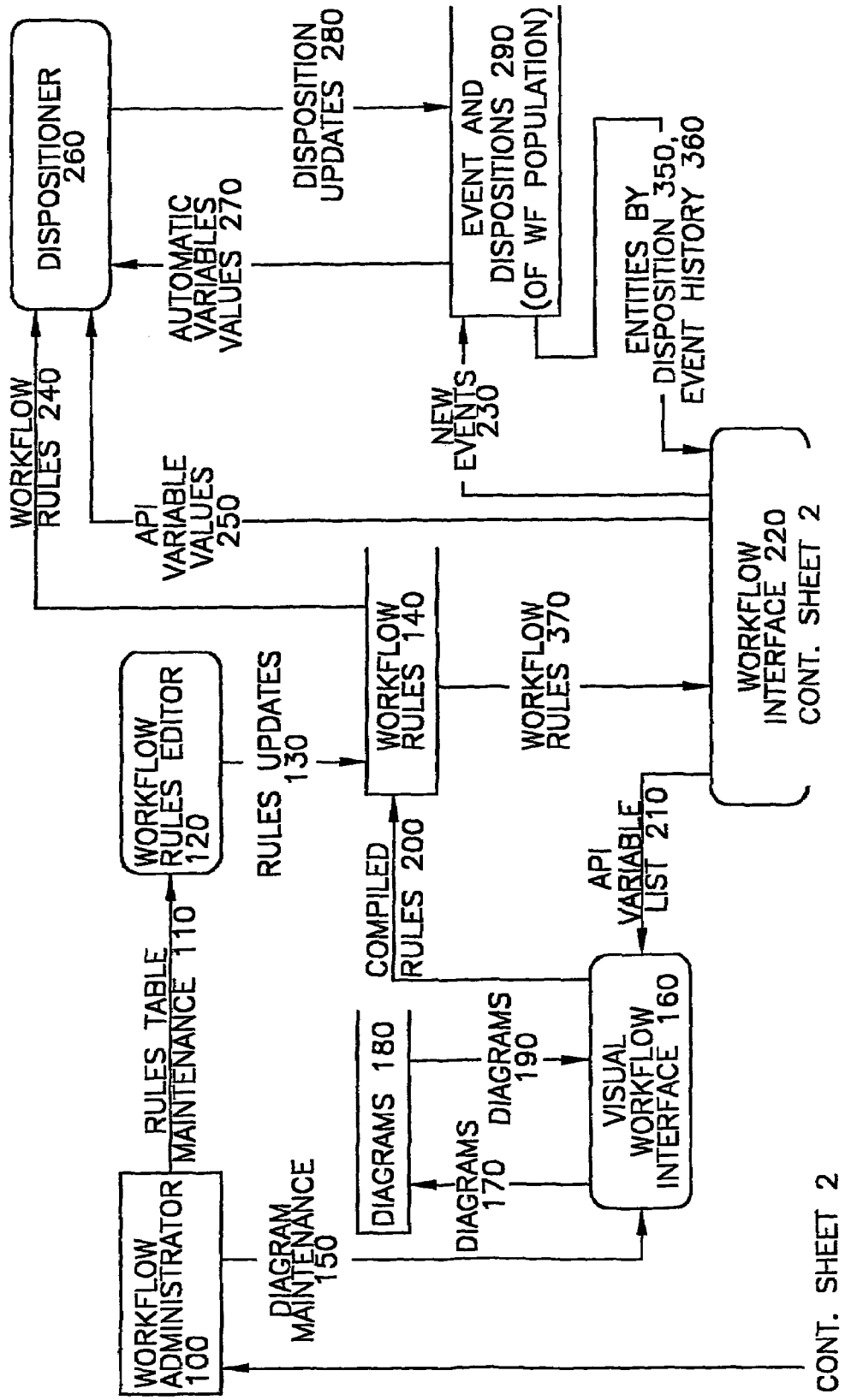
FIG. 1 is a block diagram of a workflow system in accordance with one embodiment of the invention.

Workflow System Overview:

The overall workflow system 10 in accordance with one embodiment of the invention is depicted in FIG. 1. It is noted that FIG. 1 depicts a "logical model" of the functional components of the system. While the functional processing depicted in this logical model represents one embodiment of the invention, the invention is not limited in scope in that respect and other "logical and physical implementation of the components depicted may vary widely based on the technology in which they are implemented and on design considerations.

System 10 includes a plurality of external interfaces, such as workflow administrator 100, operational management 480 and end users 440, that illustrate typical users of the system. However, although the same individual may, for example, maintain diagrams, perform work assignments, and be responsible for working certain tasks generated by the system, FIG. 1 illustrates three separate logical users, corresponding to the functions performed by the user.

System 10 also includes a plurality of processing modules such as workflow rules editor 120, dispositioner 260, visual workflow interface 160, workflow interface 220, external technology interface 590, third party system 330, third party system interface 310 and work manager 420.

System 10 also includes data storage modules, such as workflow rules storage 140, events and dispositions storage 290 and diagrams storage 180.

FIG. 1 also depicts the data flows represented by the connecting lines between various modules corresponding to logical data flow between these modules.

In accordance with one embodiment of the invention, workflow rules editor 120 is configured to receive desired workflow rules from an administrator 100. Workflow rules editor 120 is also configured to receive updates on a designed workflow. A workflow rules storage module 140 is coupled to workflow rules editor 120 so as to receive and store information corresponding to a desired workflow.

A workflow interface 220 is coupled to workflow rules storage 140 so as to retrieve the corresponding workflow rules for processing. Workflow interface 220 is also coupled to a work manager module 420, which in turn is configured to interact with end users 440 and operational management user 480 and in effect to provide an interface with the system to manage the workflow.

Workflow interface 220 is also coupled to a third party system 330 either directly or through a third party system interface 310. Third party system 330 may be a system that workflow tool system 10 intends to automate. For example third party system 330 may be a hospital billing system in a hospital, or an order processing system in a manufacturing plant as will be explained in more detail later.

Workflow interface 220 is also coupled to a dispositioner 260, which is configured to process the workflow rules stored in workflow rules storage 140. Dispositioner 260 periodically updates information stored in events and dispositions storage 290, which stores information corresponding to the entities that are being automatically processed by workflow tool system 10. For example, such entities may include individual accounts in the hospital billing system mentioned above. As each account is worked on by system 10, event and dispositions storage 290 updates the information corresponding to that account.

Workflow interface 220 is also coupled to various devices via external technologies module 610 and external technology interface 590. These devices may include, printers, faxes, the Internet and email, among other examples.

In accordance with one embodiment of the invention system 10 also includes a visual workflow interface module 160 that is configured to enable a user to define workflow rules by employing a diagramming method. Workflow interface module 160 is coupled to a diagrams storage module 180, which is configured to store the visual workflow rules created via visual workflow interface 160.

For system 10, workflow is controlled by information stored in workflow rules storage 140, which as explained above, is maintained by workflow administrator 100. This maintenance may be performed manually via workflow rules editor 120. Rules must ultimately conform to the workflow method, which will be discussed in detail in this text.

The rules may also be represented visually, and may be specified and maintained through visual workflow interface 160. To this end, diagrams may be developed and stored in the diagrams data store 180. Once diagrams are created, they may be retrieved and also compiled by visual workflow interface 160, and stored in workflow rules data storage 140.

In accordance with one embodiment of the invention, the workflow method of the present invention is "event-driven." As such, deploying the method requires defining events relating to the operation being managed and automated. The workflow is then driven in response to these events. These events are defined relative to "entities" within a "population." For example, in a "distribution" operation in which orders are processed, the entity would be defined as an "open order". In a help desk operation, the entity might be an "Open Problem", which is identified by a "Tracking Number". In a healthcare-billing operation, the entity is an unpaid "Patient Account". Although, the examples used throughout this text pertain to a healthcare-billing operation, it can be appreciated by those skilled in the art that the present invention can be employed in other workflow applications.

The workflow method requires that the entire population of entities being managed be included in the workflow. As will be discussed in greater detail, the main objective of the workflow method is to designate the "status" of an entity with respect to workflow, based on the most recent event corresponding to that entity. With respect to terminology, this status is referred to as the disposition. To this end, in a healthcare system the entity relates to an account and the disposition of that entity relates to the status of that account In accordance with one embodiment of the invention, dispositioner 260 is configured to track the disposition of each entity within the entire population. Again, for the healthcare system example, dispositioner 260 tracks the status of each account in the entire patient population.

As new events 230 are logged though workflow interface 220, dispositioner 260 determines the new disposition for each entity according to workflow rules stored in storage 140. Dispositioner 260 then sends disposition updates 280 to events and disposition storage 290, which contains the event history and current dispositions of all entities in the workflow population.

Workflow system 10, in accordance with one embodiment of the invention integrates with third party systems 330. The method of integrating with the Third Party System 330 may vary widely depending on its architecture and technology platform. If it has an "open systems architecture" which permits other current technologies to be integrated, it may provide API Variables & Events 340 directly through the Workflow Interface 220. Alternatively, a Third Party System Interface 310 may be constructed to obtain the necessary data from the Third Party System 330 to extract API Variables Values & Events 300 in the format required by the Workflow Interface 220. Ultimately, the Workflow Interface 220 logs new events 230 from Third Party System 330 and provides API variable values 250 to dispositioner 260, enabling it to perform disposition updates and provide disposition update information 280 for each entity (eg. patient accounts) in event and dispositions storage 290. As such dispositioner 260 "re-dispositions" the accounts based on the workflow rules 240 received from workflow rules storage 140.

The operational workflow is ultimately driven by work manager 420, based on information corresponding to dispositions of entities 380 received from workflow interface 220, which in turn is provided as diposition of entities 350 from events and dispositions storage 290. Information corresponding to the history of events is provided as event history 390, received from workflow interface 220, which in turn is provided as history of events 360 from events and dispositions storage 290. Information 390 is available to provide an audit trail of events for end-users 440 as they perform work as directed by work management interface data 430, provided by work manager 420.

Certain features may also be specified in the workflow which control the behavior of work management interface 430 based on work rules 370 received from workflow rules 140 data store. These features will be discussed later in this text. As end-users 440 perform work, they log New events 450 through workflow interface 220 causing dispositioner 260 to re-disposition the accounts.

Work manager module 420 is configured to provide analytical tools for analyzing the disposition of all the entities. To this end, work manager module 420 provides information, such as 460, corresponding to disposition analysis, to operational management 480. Work manager module 420 is also configured to conduct productivity analysis and provide information 470, corresponding to productivity reporting, to operational management 480.

Operational management 480 utilizes disposition analysis data 460 and productivity reporting data 470 as management tools in establishing work assignments 490, determining staffing levels, identifying workflow changes to communicate to workflow administrator 100, and ultimately, optimizing workflow.

Work management interface 430 directs the activities of operational End-Users 440. It identifies which entities (e.g., which Accounts) require work, and the type of work required. Depending on the architecture of the Third Party System 330, and on the nature of the implementation of the workflow software, end-users 440 may access Third Party System 330 in different ways. For example, in accordance with one embodiment of the invention, at a minimum, they may access Third Party System 330 through its native access method, via operational system usage data 510 according to the directed work from work manager module 420.

In arrangements wherein Third Party System 330 runs on a "legacy" technology platform (e.g., IBM Mainframe, AS430) for which access can be scripted using terminal emulation software, a legacy system interface 520 is provided, which can obtain Entities Identifiers 530 for which access is required (e.g., the "Account Number"), and "script" the keystrokes required in the legacy system to access the required account as depicted by the Scripted System Access 540 data flow. Once in the account on the legacy system, the Legacy System Interfaces 520 provides "pass-through" access to Third Party System 330 as depicted by 550 and 560 where end-users 440 are enabled to utilize the full system functionality of Third Party System 330.

Finally, if Third Party System 330 has an "open systems architecture" which permits other technologies to be integrated, a work manager API 570 (i.e., "Application Programming Interface") enables Third Party System 330 to invoke functions of work manager 420 to obtain the necessary "data views" and entity identifiers to drive work.

As mentioned before, workflow system 10 in accordance with one embodiment of the invention includes external technologies module 610 through an external technology interface module 590. External technologies module 610, in accordance with various embodiments of the invention includes traditional "mail-merge" applications for letter printing and mailing, mail servers for email generation, "auto-dialer" applications for phone calls from a service bureau, or any other external applications which may ultimately result in events which are relevant to the workflow. The type of work to be performed would be identified as a distinct disposition in the workflow, and entities for these dispositions are provided as data 580 received from events & dispositions data store 290. As these entities are extracted, events 620 are logged by workflow interface 220 and provided as new events 230 to data store 290, so as to enable dispositioner 260 redisposition the entities (e.g., Awaiting Letter Generation) as they are exported to External Technology module 610.

External technology module 610 would be "driven" by driver interface data 600, which for example, could consist of a file containing all accounts requiring a letter. External technology module 610 obtains any application data 660 required directly from third party systems, or from workflow interface 220 through API Variables 650 to the external technology interface and onto driver interface data 600. Any events represented by data 630 resulting from work performed by the external technology 610 would be passed back through external technology interface 590 as update events data 640 to workflow interface 220 enabling the entity to be re-dispositioned by the dispositioner 260.

Workflow Method Overview

As discussed, the workflow method is "event-driven", in that work is driven off of events. The workflow method requires that the entire population being managed have at least one event defined to the workflow. In the healthcare-billing environment, every "Account" has an Initial Bill Drop" which occurs when the open balance is created, and an insurance company or other prospective payer is billed. Many other events may occur over the course of the open account, until eventually the account balance goes to zero ($0), and no more work is required. Implementing this workflow method requires defining which of these events have an impact on the flow of the operation, and "defining them to the workflow".

As discussed, the main objective of the workflow method is to designate the disposition of an account based on the most recent event. The disposition of a patient account may be that it is scheduled for some work step such as contacting an insurance company to request payment. The disposition may alternatively be a status of "inaction" such as when an account has just been billed, and insufficient time has elapsed to warrant follow-up. In this situation, the account may be in a disposition of "Awaiting Payment".

This highlights one differentiating aspect of this workflow method relative to other methods and tools. In this method, a status of "inaction" is just as important to define to the workflow as status requiring an action. This allows every entity in the population, or in the case of healthcare-billing, every "Account in the Receivable", to be accounted for.

Continuing with the healthcare-billing example, other critical events to include in the workflow might be Payments or Denials from an insurance company or other prospective payer. In fact, if the only events defined to the workflow are "Initial Bill Drop", "Payment", and "Denial" in a receivable population, where the population contains all non-zero balance accounts, they may map to dispositions as follows:

| Event | Disposition |
|---|---|
| Initial Bill Drop | Accounts Awaiting Payment |
| Payment | Accounts with a Balance After a Payment |
| Denial | Accounts where Payment was Denied |

Even with only these three events defined in the workflow, it is useful to portray the receivable population by disposition. If the receivable contained 10,000 accounts, and the total of the account balances are $10,000,000, a breakdown of accounts by disposition may look as follows:

| Disposition | #-Accounts | $-Accounts |
|---|---|---|
| Accounts Awaiting Payment | 6,000 | 8,000,000 |
| Accounts with a Balance After a Payment | 1,000 | 300,000 |
| Accounts where Payment was Denied | 3,000 | 1,700,000 |
| Totals | 10,000 | $10,000,000 |

With respect to interpreting the above, since the disposition is based on the most recent event, the 6,000 Accounts have not had a Payment or Denial because the most recent event is an "Initial Bill Drop". They are therefore, part of the "Accounts Awaiting Payment" The remaining 1,000 and 3,000 accounts have had Payments or Denials respectively. Since the population only includes accounts with a non-zero balance, if a Payment is the most recent event on the Account and it is still in the population, these are "Accounts with a Balance After a Payment". If the entire balance is paid, the account is no longer in the population, which explains why there might be more accounts with Denials than Payments remaining in the population.

Even this basic breakdown portrays useful information relating to "workload". Specifically, the 1,000 "Accounts with a Balance After a Payment" are likely require someone to "work", either to write-off the balance, or to bill the patient or next payer. Likewise, the 3,000 accounts with Denials require similar work.

Workflow Rules

Figure 2:
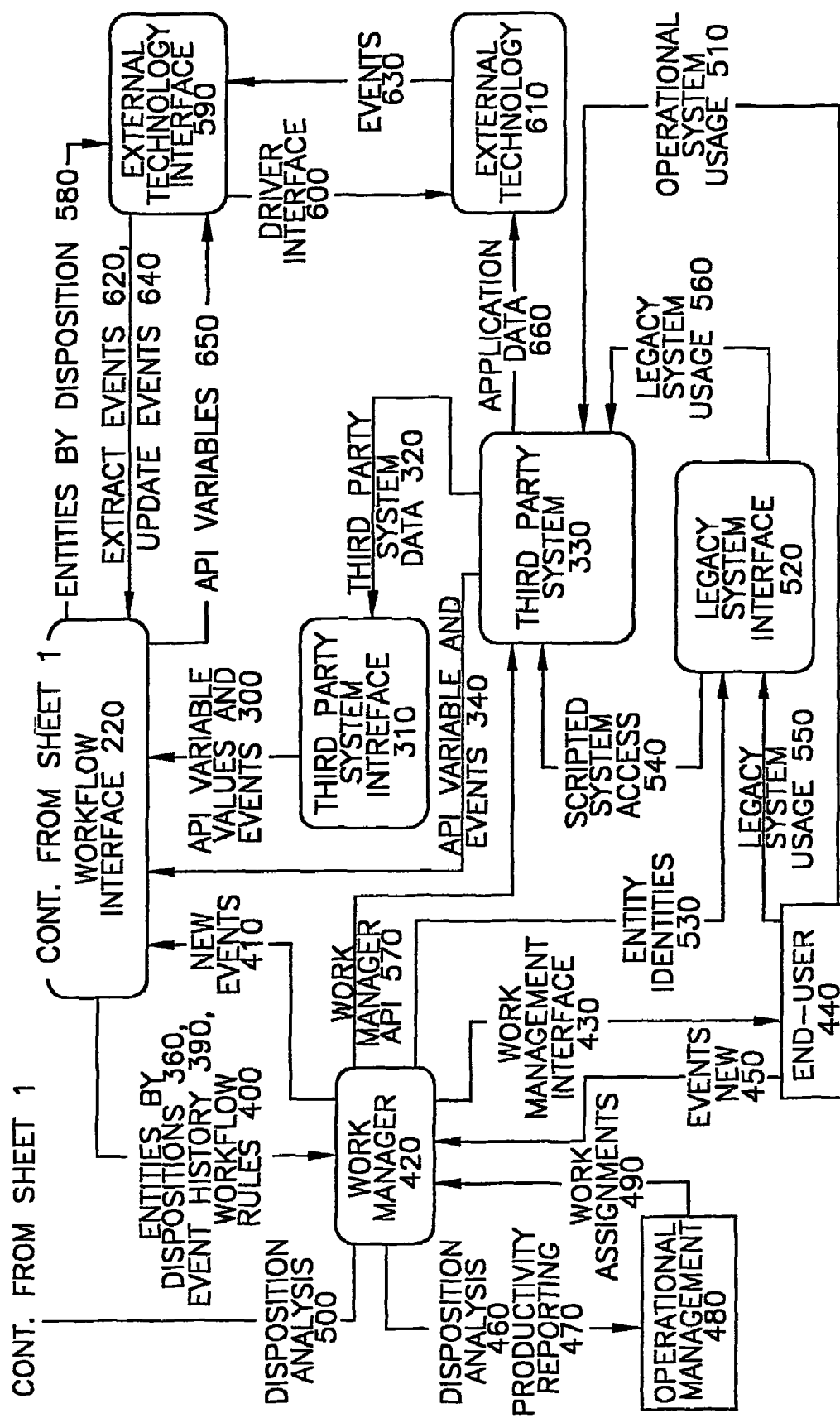
FIGS. 2a-2e illustrate exemplary rule tables in accordance with one embodiment of the invention.

In order to build on the healthcare-billing scenario, FIG. 2 introduces a table, contained in workflow rules data store 140, in accordance with one embodiment of the invention. The table illustrated in FIG. 2 may be created and maintained in a system 10 by workflow rules editor 120. It is noted that the physical layout and architecture of the table (or tables) utilized in the implementation of the software may vary depending on design considerations and on the technology platform in which the software is deployed, and the invention is not limited in scope in that respect. This table may be utilized by software to control the determination of the disposition of an account based on the most recent event. As such, in response to each new event detected by the system, dispositioner 260 examines the table by following the workflow rules to locate the disposition corresponding to the new event for each entity.

With respect to the columns in the table, "Id" contains a unique "identifier" which identifies the entries (i.e., rows) of the table, enabling entries to be referenced by other table entries utilizing the "pointers" in the "Ptr1" and/or "Ptr2" columns. The "Wf" and "Tr" columns contain the entry's "Workflow Number" and "Track Number" which will be introduced later in this text. The "Type" and "Sub-Type" columns identify the type of entry contained in the table row. This enables events and dispositions and to be represented in different entries of the table as depicted in FIG. 2. The "Text" and "Specification" columns are used somewhat differently depending type of entry designated in the "Type" and "Sub-Type" columns.

FIG. 2a contains table entries which are reflective of the workflow examples discussed thus far. Dispositioner 260 can determine an account's disposition by locating the most recent event on the table, then "navigate" to the disposition utilizing the Ptr1 value. For example, if the most recent event on the account is a Denial, the software would first locate Id #5 as the table entry with a "Type" value of "Event", and a "Text" value of "Denial". It would then move to the entry referenced by the "Ptr1" value of 6. Id #6 is a disposition of "Accounts where Payment was Denied"; The software has thus determined the account's disposition.

In the healthcare-billing examples, the 1,000 and 3,000 Accounts which-have had Payments or Denials are known to require some work because of the remaining balance. As far as the 6,000 accounts "Awaiting Payment", they may or may not require "Follow-Up" depending on the number of days which have "elapsed" since the "Initial Bill Drop" event. In order to address this, a new entry of Type of "Connector" and Sub-Type of "Condition" is introduced into the rules table as depicted in FIG. 2b. This entry requires the Dispositioner 260 to evaluate the Boolean expression "Elapsed_Days>25", where Elapsed_Days is relative to the most recent event of "Initial Bill Drop". If the condition is true, Dispositioner 260 navigates or "branches" to the table entry reference by Ptr1. Otherwise, it branches to the entry referenced by Ptr2.

It is noted that in the "Sub-Type" column for disposition, entries have been set to either "Task" or "Pause". These are different types of dispositions, where tasks are dispositions requiring work to be performed, and pause indicates that the account is in a status of waiting for some external action to take place (i.e., "Awaiting Payment").

If all 10,000 Accounts in the original population were "re-dispositioned" by the Dispositioner 260 according to the new workflow rules in FIG. 2b, a breakdown of accounts by disposition may look as follows:

Disposition

| Type | Disposition | #-Accounts | $-Accounts |
|---|---|---|---|
| Pause | Accounts Awaiting Payment | 5,000 | 6,600,000 |
| Task | Bill Follow-Up | 1,000 | 1,400,000 |
| Task | Accounts with a Balance After a Payment | 1,000 | 300,000 |
| Task | Accounts where Payment was Denied | 3,000 | 1,700,000 |
| Totals | | 10,000 | $10,000,000 |

The introduction of "conditional" entries and different types of dispositions in workflow rules 140 adds flexibility in identifying the accounts in the population requiring work as well as the type of work required.

Diagramming Method Overview—Visual Workflow Interface 160

As the workflow rules table expands, maintainability using a workflow rules editor 120 would get very cumbersome. Furthermore, the nature of the rules discussed in an objective of identifying a disposition based on the most recent event, lends itself to a diagramming method supported by a graphical interface in accordance with one embodiment of the invention.

Figure 3:
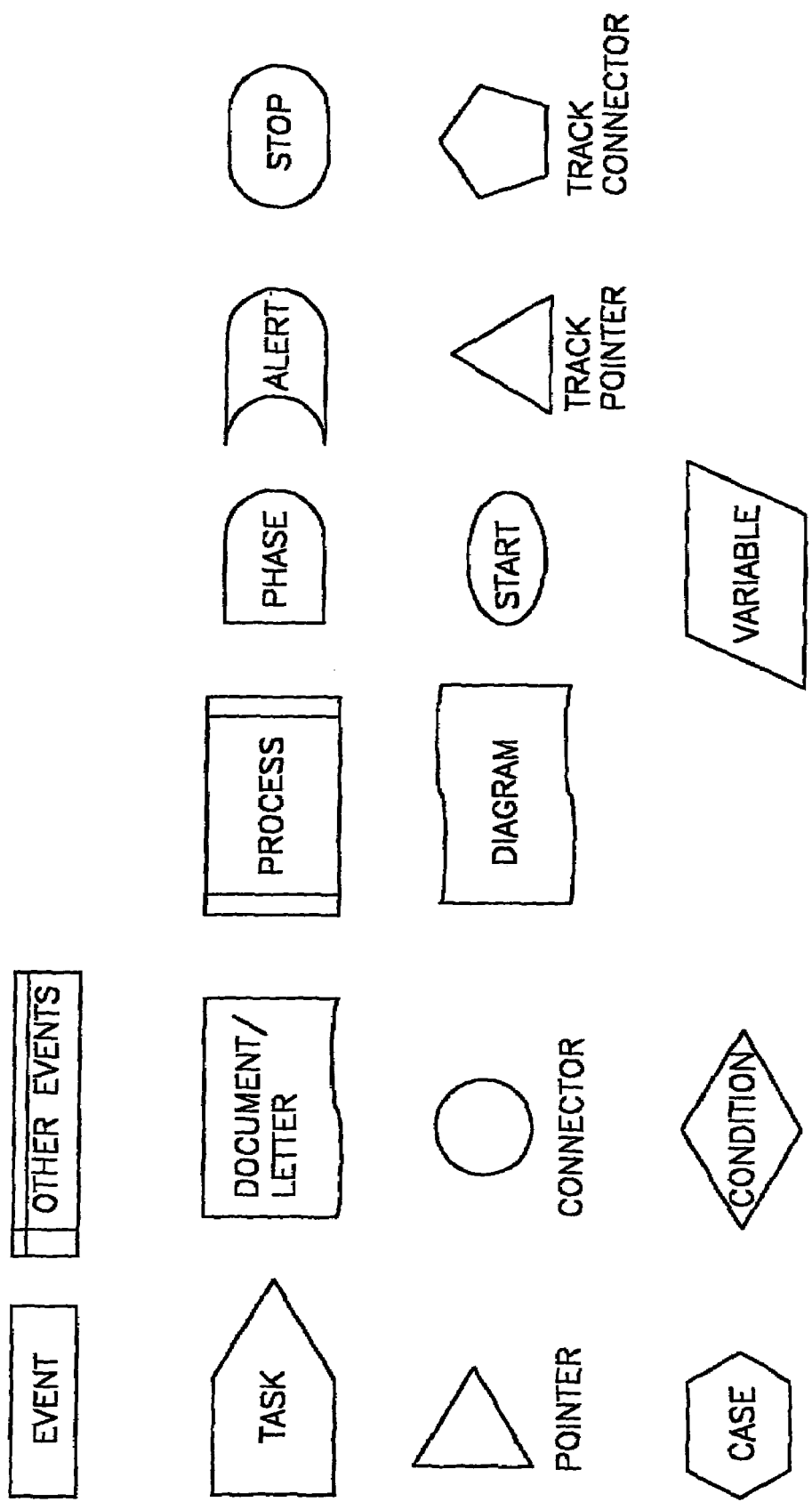
FIG. 3 illustrates exemplary workflow symbols employed by the workflow system in accordance with one embodiment of the invention.

The diagramming method utilizes numerous commonly used workflow symbols. While the actual symbols utilized are not relevant to the workflow or diagramming methods, common symbols were chosen where possible to contribute to the intuitiveness of the method in accordance with various embodiments of the invention. Valid symbols currently used in the diagramming method are depicted in FIG. 3.

Figure 4:
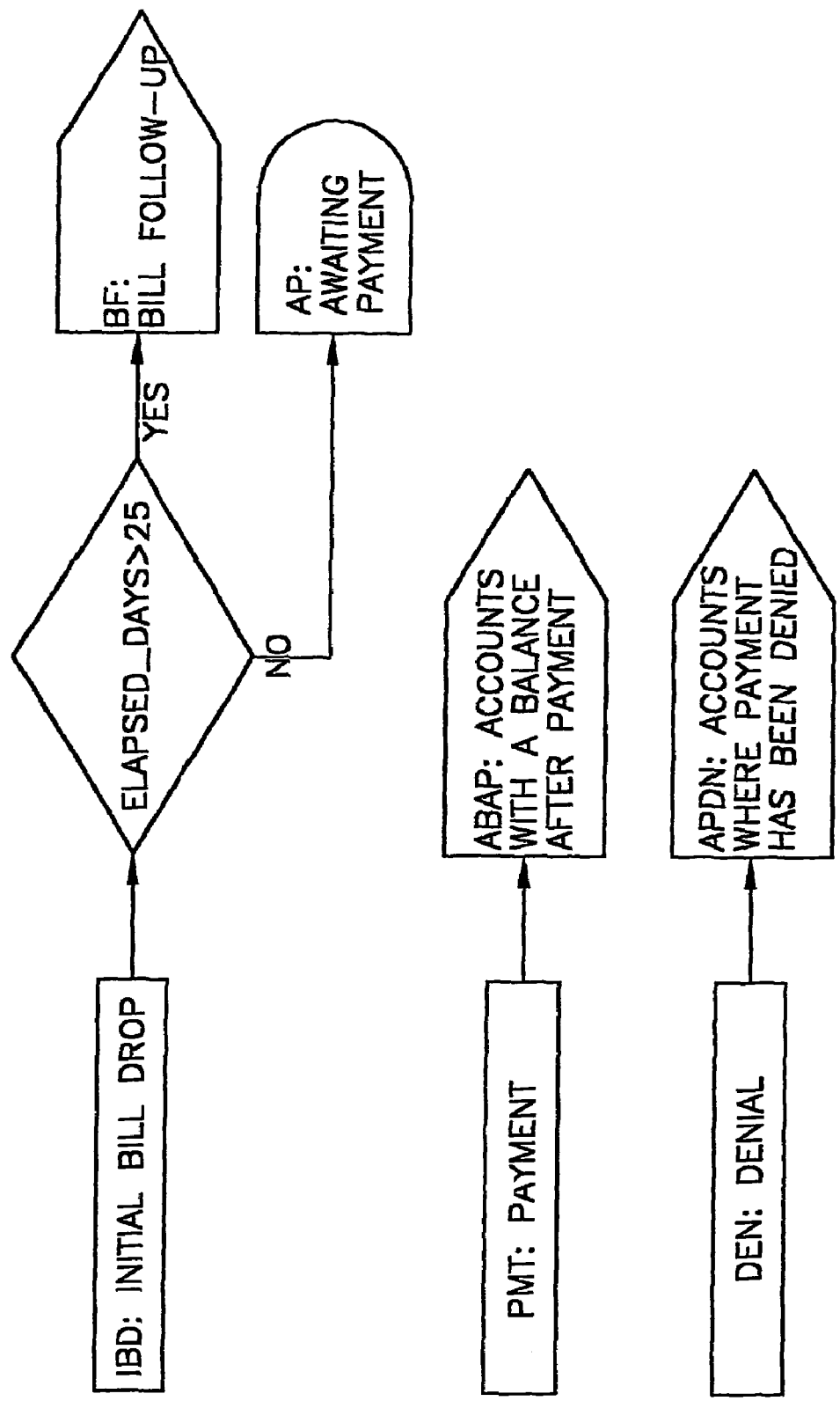
FIG. 4 illustrates a diagramming method of a workflow in accordance with one embodiment of the invention.

FIG. 4 contains a diagram with the workflow defined thus far. Note that each symbol on the diagram corresponds to an entry in the Workflow Rules table. An "Initial Bill Drop" event routes to either a task or a pause depending on the results of the condition. Payment or Denial events route to their corresponding tasks as discussed earlier. The diagram is very easy to follow, much more so than the rules table in FIG. 2.

Visual workflow interface 160 is used to create and maintain workflow diagrams in workflow diagrams storage 180. The Visual Workflow Interface is also referred to as the "Workflow Director". Workflow Director not only facilitates creation of workflow diagrams, but also supports the integrity of the workflow method. It enables creation of new events and other symbols by drag-and-drop arrangement from a symbol palette. It provides for drawing the associated connecting lines using a mouse, and disallows invalid connections (e.g., a pause may not reference an event). It supports specification of information within symbols. By simply double-clicking on a symbol, a template is provided for the specification information valid for the symbol type.

In further analyzing and defining the workflow, many new events may be introduced. Workflow Director allows creation of as many diagrams as are necessary to define all events relevant to the workflow. Once all events have been defined, Workflow Director compiles all diagrams comprising the workflow to create the workflow rules as stored in workflow rules data store 140, with symbols from all included diagrams represented as entries in the table. In doing so, it also performs other validations to ensure, for example, that references from one diagram to another are resolved. If a pointer symbol from one diagram references a connector symbol in another diagram, the connector symbol must be present in the other diagram in order for the diagrams to compile "cleanly" and for the workflow rules data store 140 to be updated.

Note that the events and dispositions on FIG. 4 are "coded". The event "Initial Bill Drop" is coded as an "IBD", and the task "Bill Follow-Up" is coded as a "BF". Coding of events and dispositions simplifies referencing, and facilitates administration and reporting. In accordance with one embodiment, up to a 4 character code is defined for all events and dispositions. Codes are also used elsewhere in the system where appropriate, including diagrams, qualifiers (discussed later), etc.

The diagramming method deployed in supporting the workflow method discussed enables workflow to be controlled simply, yet extremely effectively. Its main objective is to route events to dispositions. Other visual workflow tools tend to use symbols or diagram "nodes" to represent work functions in an organization, and map the flow of documents or other work from one function to the next At first blush, this conventional approach is easy for end-users to relate to, since their respective functions can be easily located on the diagrams. The problem with this approach is that workflow from or to a given work function tends to get very complex. Routing iterations, status changes, and the effects of external events or operations can get too cumbersome to represent visually.

The combined workflow method as supported by the diagramming method, becomes an extremely effective approach to managing workflow. Once the workflow method is understood, the diagramming method becomes very intuitive. A reasonably logical thinking operational end-user, with little or no technical background, and with an understanding of the business processes being managed can develop and maintain workflow diagrams conforming to this method with very little training.

Healthcare-billing is very complex. Without proper tools, complex operations involving interrelated manual and/or automated work steps can result in tremendous inefficiencies. This type of operation could greatly benefit by optimized workflow through increased payments from insurance companies or other payers. In expanding on the healthcare-billing examples introduced earlier, FIGS. 5 through 12 contain exemplary workflow diagrams which might be used to control a full healthcare-billing operation as conducted in a hospital environment These diagrams will be referenced throughout the remainder of this text to explain different aspects of the workflow method of the present invention.

Workflow Variables

The "condition" symbol and associated workflow rules table entry in FIG. 2 evaluated a Boolean expression containing a "workflow variable" of Elapsed_Days. As the Dispositioner 260 navigates through workflow rules 140 and the associated table, several types of workflow variables are supported in order to effectively control workflow as follows:

"Automatic" Variables: Most automatic variables relate to events and dispositions previously logged in the Events & Dispositions data store 290. In fact, most are attributes of the most recent event such as the Elapsed_Days variable used earlier. To this end, a variable is assigned for each entity that represents the corresponding elapsed dates since a reference time. The Event_Date and the Event_User who recorded the last event are also available. Today's date is another example of an automatic variable. The value of these variables are hence maintained and stored in events & dispositions data store 290.

"API" Variables: In order for the workflow software to be useful in a business setting, it is interfaced with a business oriented Third Party System 330. For example, in accordance with one embodiment of the invention, in a hospital environment, third party system 330 is the hospital's main computer system. Workflow Interface 220 obtains the values of variables required to drive the workflow from this Third Party System. For example in the healthcare-billing application, the Account-Balance, Admit-Date, Discharge-Date, Original-Bill-Date, and Original-Balance variables might all be required in the workflow. Depending on the nature of the implementation, the Workflow Interface 220 may be a real-time or a "batch" interface.

"Temporary" Variables: As part of the diagramming method, a temporary variable may be utilized to temporarily store the value of another variable or constant within Dispositioner 260 as it navigates from the most recent event to its corresponding disposition. FIG. 5 contains an example of the use of a temporary variable, where the value of the "WAIT" variable is set differently depending on the most recent event. This "WAIT" variable is then evaluated against the number of "Elapsed_Days" since the event, to determine if a task will be scheduled to do a "Bill Follow-up", or if the account will be in an "Awaiting Payment" disposition. Note that temporary variables may be numeric, character (i.e., alphanumeric), or date/time, which is defined when the temporary variable is created. FIG. 2c illustrates the corresponding table entries for this "WAIT" variable.

Workflow variables are utilized within the entries of workflow rules data store 140, and are specified in the symbols of the diagramming tool. Depending on the symbol type, they may be utilized for different purposes. In the condition symbol as discussed earlier, they are used within Boolean expressions which determine the routing to the next symbol. A temporary variable symbol may be set to the value of other variables. In dispositions, they are used to specify qualifiers (discussed later), or to specify the "Order By" value used in prioritizing work. Use of workflow variables will be discussed in greater detail through the remainder of the description of various embodiments of the invention.

The availability of workflow variables enables the use of Boolean expressions (as seen earlier), as well as numeric and character handling operators and functions seen in traditional programming languages. This can be implemented through third party "Lexical Analyzers" embedded in the system, or can be custom developed within various tools. The syntax of the "language" supported is not particularly relevant to the invention. It is important, however, that that the language support a wide range of arithmetic and character based expressions, operations, and functions, as will be seen throughout the examples in this text.

"Navigation" Using "Connectors"

As discussed, the main objective of the workflow and diagramming method is to determine the disposition based on the most recent event. Events are represented on one or more diagrams, and also as entries on workflow rules table 140. Dispositioner 260 determines the disposition by locating the most recent event on workflow rules table 140, and "navigating" through the table entries until a disposition entry is reached. To perform this navigation, various "connecting" symbols and associated table entries are utilized. Connectors currently supported in the workflow method may be categorized as follows:

Basic Connectors:

Pointer: A pointer directly references (i.e., points to) a connector with the same label value.

Connector: A connector is directly referenced (i.e., pointed to) by a pointer symbol with the same label value. Examples of the use of pointers and connectors can be found in FIG. 5. For example, the pointer with the label "BA" which points to the "BA: Bill Account" task. It is directly referenced by several pointers on the same diagram, including the "BA" pointer following the "BR: Billing Required" events, which follow both the "BF" and "MRBI" tasks. Note that pointers may reference connectors on other diagrams. The "SP" (Self Pay) pointer references the "SP" connector on the "SP" diagram in FIG. 7.

Diagram: A diagram is simply a different way of directing logic flow to a different diagram (as in the above "SP" pointer example). When used, a start symbol must be present in the referenced diagram. FIG. 7 contains a diagram symbol, which references the "WO" (write off) diagram in FIG. 8.

Start: As discussed, a start identifies the logic starting point when the diagram is referenced by a diagram, or by a subroutine (discussed later).

Track Pointers and Track Connectors: A track pointer is similar to a pointer, but references a track connector in a separate track. Tracks will be discussed later in this text in a separate section, which will include examples of the use of track pointers and track connectors.

Conditional Connectors:

Condition: A condition contains a Boolean expression. Depending on whether the expression is true or false, the "logic route" branches to the "Yes" or "No" labeled route respectively. An example of a condition was provided in FIG. 4, where the expression "Elapsed_Days>25" was evaluated. The logic route branched to the BF task if the expression was true, or the AP pause if false.

Case: A case is similar to a condition, except that multiple Boolean expressions may be specified. Using a case symbol, Boolean expressions are built into the "connecting lines" from the case symbol. Expressions are evaluated in the order specified on the line, and if none of the expressions are true, the "logic route" branches to the otherwise condition. Any number of conditions may be specified in separate connectors of a case condition. An example of the use of a case symbol is provided in FIG. 7.

Subroutines:

Subroutine: A subroutine is a special kind of "branching" connector, which will be discussed in detail in the "Subroutine" section later in this text Disposition Types As discussed earlier, a main objective of the diagramming method is to identify the next action (or inaction) based on the latest event. This action (or inaction) is referred to as the account's disposition. Valid events are those, which are included on the diagrams, which define the current workflow. For each account in the workflow, Dispositioner 260 utilizes the most recent event defined to the workflow and stored in storage 290, locates that event on workflow rules 140, then navigates through the rules until it reaches a disposition.

Different "types" of dispositions are supported by the workflow method, and are represented by different symbols on workflow diagrams, and correspondingly different values in the "Sub-Type" field if the workflow rules table from FIG. 2. The account may be scheduled for some type of work as specified in a task symbol (e.g., "Bill Account"), or may be scheduled for some automated step such as a generated letter or an electronic operation (e.g., an automated credit check). Alternatively the account may be in a "waiting" state as designated by a pause symbol, or further work may not be scheduled on the account as designated by a stop symbol.

In accordance with one embodiment of the invention, workflow director diagramming tool supports 6 different types of dispositions, although the invention is not limited in scope in that respect. For example, system 10 can be configured to support as many different disposition types as are needed to represent differing workflow statuses. To this end, in accordance with one embodiment of the invention, for example, a new disposition type may be added for an action of generating an email. Some of the disposition types supported are as follows:

Tasks: Tasks are used repeatedly in the healthcare-billing workflow to prompt work to be performed in the billing operation.

Alert: Alerts are used to identify situations where accounts are in an "overdue" status. In the healthcare-billing workflow, an alert is used in place of a task when it is desirable to obtain a printed list of accounts in alert status, rather than prompting work directly from Work Manager 420.

Document: A document disposition is used to identify accounts for which a letter or other document is to be generated. External Technology Interface 590 may be used to create a Driver Interface data 600 of all accounts requiring documents. External Technology module 610 is employed to perform a mail-merge application to print letters.

Figure 8:
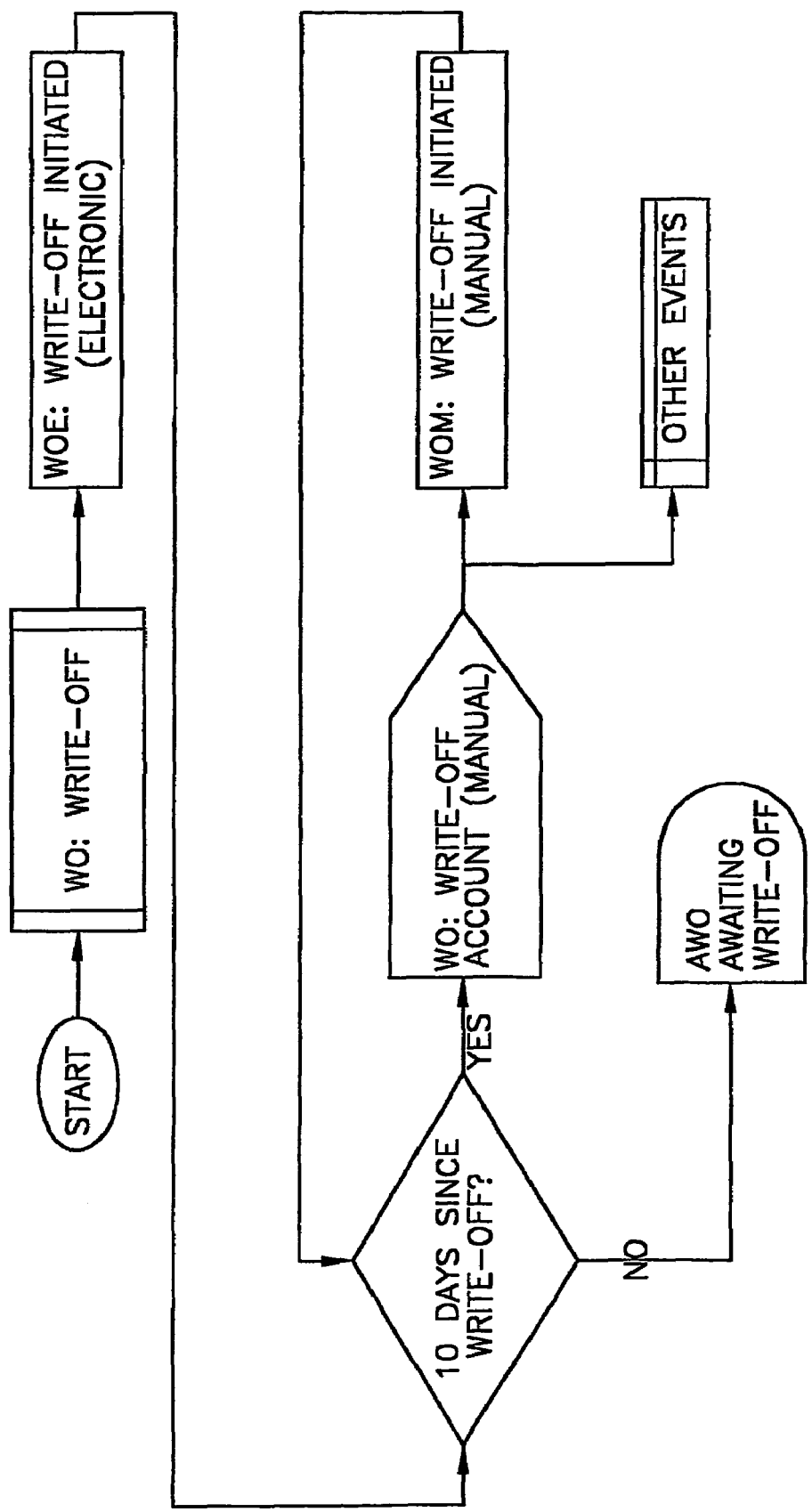
FIG. 8 illustrates a workflow diagram relating to FIG. 5 in accordance with one embodiment of the invention.

Process: A process is used in the workflow to identify when accounts are scheduled for an electronic process. For example, FIG. 8 illustrates a process to initiate an electronic write-off. External Technology Interface 590 may again be used to create a Driver Interface data 600 consisting of a file containing all accounts to be written off electronically. This file might be passed back to the healthcare-billing system (i.e., the Third Party System—330) to initiate an automated write-off.

Pause: As discussed earlier, a pause represents a status of "inaction" which is used when the account is in a "wait" state such as waiting for a payment as in the example discussed earlier.

Stop: A stop is another status of "inaction", and only differs from a pause is that it may be used in designating that no further work is expected to be performed on the account. In managing workflow using an analysis of accounts by disposition, it is useful to differentiate the population of accounts for which no further work is required, from those which are in a pause status awaiting further activity.

Disposition Qualifiers

In a healthcare-billing operation, actual billing procedures and/or required billing expertise may vary depending on the type of billing to be performed. While the basic billing and follow-up rules depicted on the diagram may be the same for all bills, the assignment of tasks to specific users or user groups may be more complex. Billing groups are often segregated by "Patient Type" and "Financial Class". The "patient type" identifies whether the account is "inpatient" or "outpatient" The "Financial Class" identifies the type of payer responsible for the account balance, such as commercial, Medicare, and self pay. To accommodate this segregation of work, "Bill Account" tasks need to be delineated accordingly. This is achieved through the use of "qualifiers".

Dispositions may either be qualified or non-qualified. If dispositions are qualified, a qualifier type is identified. Different qualifier types may be established to achieve different types of delineation. For example, one task may need to be delineated by Patient Type and Financial Class, others may only be delineated by Patient Type, and yet others may be delineated by the userid and/or the biller assigned to the account.

Workflow variables are used to specify the values of disposition qualifiers. For example, if the billing department is organized by Patient Type and Financial Class, it may be desirable to differentiate "Bill Account" tasks according to this breakdown. The qualifier would therefore be specified as follows:

Patient_Type ∥":"∥ Financial_Class

It is noted that a "concatenation" operator (i.e., a "∥") is used to combine or append variables and constants in "constructing" the value of the qualifier. The above specification informs Dispositioner 260 that when an account is in the disposition of "Bill Account", to set the value of the qualifier to the value of the Patient_Type variable, concatenated with a colon, to also set the value of the qualifier to the value of the Financial_Class variable. The qualifiers are represented in the specification field of workflow rules table 140, as illustrated in FIG. 2c.

If the Patient_Type API variable contains the either an "I" or an "O" for Inpatient or Outpatient, and the Financial_Class variable contains a "C", "M", or "H", for Commercial, Medicare, and HMO respectively, then "Bill Account" tasks will be delineated into six groups of tasks as follows:

| Task Code | Task Description | Qualifier Code | Qualifier Description |
|---|---|---|---|
| BA | Bill Account | I:C | Inpatient/Commercial |
| BA | Bill Account | I:M | Inpatient/Medicare |
| BA | Bill Account | I:H | Inpatient/HMO |
| BA | Bill Account | O:C | Outpatient/Commercial |
| BA | Bill Account | O:M | Outpatient/Medicare |
| BA | Bill Account | O:H | Outpatient/HMO |

Work Manager 420 may then be used by Operational Management 480 to receive work assignment data 490 for use by individual billing staff who are assigned to handle these qualified tasks according to their responsibility.

Disposition qualifiers add tremendous flexibility and control to workflow administrator 100 in segregating work to different billing groups. Qualifiers may be used with all disposition types to delineate the workflow population into sub-groups as needed. In the "Awaiting Payment" pause, for example, delineation by the qualifier specified above enables management to see how much has been billed and awaiting payment by Patient Type and Financial Class. Alert qualifiers enables different lists to be produced as delineated by the qu alifier. Documents may be qualified by a letter type, enabling different versions of letters to be produced for accounts with different characteristics. For example, it may be desirable to use a different letter series for those patients where there is no insurance versus those where the balance is after insurance payments.

To this end, in accordance with various embodiments of the invention several qualifiers are defined so as to enable various delineations. For example a separate qualifier may be specified as the end-user responsible for working tasks being generated. The fact that qualifiers allow combining variable values enables this to be achieved by simply adding the assigned userid as the first part of the qualifier. For example, if in the ""Bill Account" Task, work in the "Outpatient—Commercial" billing area is to be divided among 2 users with userids of "John" and "Mary", a temporary variable of "Userid" is defined, and logic is included to define the rules for assigning the value of "Userid" to either "John" or "Mary" based on account characteristics (e.g. based on an "alpha-split" of the first letter of the patients' list name). Then the qualifier may be specified as follows:

Userid ||":"|| Patient_Type ||":"|| Financial_Class

This would result in the following delineation within Outpatient Commercial tasks:

| Task Code | Task Description | Qualifier Code | Qualifier Description |
|---|---|---|---|
| BA | Bill Account | John:O:C | John's Outpatient/Commercial |
| BA | Bill Account | Mary:O:C | Mary's Outpatient/Commercial |

The "Order By" Parameter

Another parameter that may be specified for Dispositions is the "Order By" parameter. Like qualifiers, the Order By, parameter is specified utilizing workflow variables and constants. It is used to specify the default sort order of the workflow population within a disposition. For tasks, the result is a "prioritization" of work within the population. For example, the following was specified in the Order By parameter for the "Bill Account" task:

Descending (Balance)

This results in the working of the Accounts in a descending balance order (i.e., highest to lowest balance). Note that in the above example, a function of "Descending" was used. This function takes the value of "999,999,999", and subtracts the value of the "Balance" API variable. This results, in effect, in "inverting" (i.e., reversing) the order of the parameter supplied. This technique is commonly referred to as "taking the nine's complement" of the value. For example, 2 accounts with balance values of:

| Account# | Balance |
|---|---|
| 01 | 400 |
| 02 | 600 | would be ordered as follows:

| Account# | Balance | Nine's Complement |
|---|---|---|
| 02 | 600 | 999,999,399 |
| 01 | 400 | 999,999,599 |

The Order By parameter can be very useful in different aspects of the workflow implementation. For example, if a certain task requires working accounts off of a report which is sorted alphabetically by patient last name, the Patient_Last_Name API Variable may be specified in the Order By parameter to facilitate matching the report with the work list produced by the Work Manager 420. In other situations, it may be desirable to order work by "Event_Date", which, depending on the event, will result in the work being performed in the order in which it was "triggered".

Another example of the use of the Order By parameter is in letter generation using the document disposition. Postal discounts may be achieved through pre-sorting of mail. If the postal routing fields (e.g., zip code) were provided as API variables, letter printing in optimal pre-sort order may be achieved Outcomes The "BF: Bill Follow-Up" task on FIG. 5 connects to six event symbols. This type of construct has special meaning to the workflow system 10. It tells the system which events are valid upon completion of the task. The Work Manager 420 software can require users working tasks to select the "outcome" from list of events referenced by the diagram It obtains the list from the Work Rules 370 data flow from the Workflow Rules 140 data store. The order of appearance to the end-user will be based on the order on the diagram. In order to "complete" the task being worked, the user must select an event as the outcome. In effect, the system "enforces" the workflow represented on the diagrams. Upon selection of an event, the selected event in the form of New Event data 450 is logged by workflow interface 220 and eventually stored in events and dispositions storage 290, causing Dispositioner 260 to re-disposition the account.

When crafting the workflow using workflow diagrams, the designer identifies the event alternatives as possible "outcomes" that would have an impact on the workflow. Although the work function of "Bill Follow-Up" may have involved many activities, the only relevant events with respect to the "routing" of workflow are those specified on the diagrams.

It is noted that one outcome of the "BF" Task is "BR", which is also an outcome of the "BA" Task The diagramming method permits the same event to appear multiple times in the currently active diagrams, so long as all instances reference the same next symbol through the use of connectors. This allows the same event to be specified as an outcome of multiple tasks.

During initial workflow development, the Workflow Administrator 100 will specify an initial list of allowable outcomes. As "exceptions" arise upon initial implementation, new events may be defined. This is how a workflow will tend to evolve, particularly in the early implementation stages. This also illustrates just how powerful the workflow software is, in that new events and associated "logic routes" can be drawn "on-the-fly" by the Workflow Administrator 100. Upon re-compiling and "activating" the updated diagrams, additional outcomes can immediately be made available to end-user 440.

The "Other Events" Outcome

It is noted that potential outcomes of the "MRBI: Mgr Rev—Billing Issues" task include an "Other Events" special symbol. This symbol instructs the workflow software to permit any valid event from the currently implemented workflow to be specified upon task completion. Depending on the nature of the billing issues on the account, it may be difficult for workflow administrator 100 to predict what course to take in all situations. Permitting specification of any valid event will ensure that all circumstances can be handled, and that no accounts can in-effect be "stuck" in the workflow.

The Event "Wait" Parameter

As work manager 420 interacts with End-Users 440 for recording new events data 450 corresponding to new events, through the outcomes feature, it may be desirable for the user to specify a time period to "wait" prior to the next follow-up. When defining events, a "Requires Wait" attribute is specified for this purpose. When specified, a "Minimum" and "Maximum" time period may be specified to enable workflow administrator 100 to establish limits on the timeframe specified by the user. The "NFR: New Follow-Up Required" event on FIG. 5 has been set-up to require a wait to be specified. If the end-user "working" Bill Follow-Up tasks is told that "the check is in the mail", he/she should set the wait value to a relatively short timeframe (e.g., 7 days) to enable the check to arrive and be posted. If he/she is told it may be a while, they can specify a longer wait. Notice that the NFR event is followed by a pointer referencing the USR connector. This in turn references a variable symbol which sets the value of the "WAIT" temporary variable to an automatic variable called "Event_Wait". This is how the wait feature is used in the workflow. The value specified by the end-user is stored along with the event in the Events & Dispositions data store 290, and made available to Workflow Rules 140 as an automatic variable.

This "wait" attribute along with the minimum and maximum values is obtained by work manage 420 as part of the work rules data 400.

Future software versions may provide other information to be required from end-users, such as capturing an email address or any other information necessary, which might be subsequently utilized in the workflow in an automatic variable of Event_Other.

Event Qualifiers

Like dispositions, events may also be qualified. When defining events, they need to be defined as either qualified or non-qualified. The same "qualifier types" that are established for qualifying tasks may be used for events. If an event is qualified, a qualifier must be included when the event is recorded. This is enforced by work manager 420 upon end-user 440 selecting an event which is qualified.

For example, the "BR: Billing Required (Next Payor)" event from the "BF: Bill Follow-Up" task on FIG. 5 is considered. When insurance is billed, it is important to know the insurance type so that follow-up efforts can be delineated. The "BR" event would therefore be qualified by insurance type. When an end-user selects the "BR" Event, work manager 420 provides a list of valid insurance type qualifiers, and requires users to select one. This is another example of the workflow being "enforced" by work manager 420 based on workflow established by workflow administrator 100.

The "Event_Code" and "Event_Qualifier" fields are made available to the workflow as automatic variables as discussed in the "Workflow Variables" section. These fields may be utilized in workflow diagrams when specifying the workflow. For example, if Medicare requires a completely different billing procedure, a condition symbol can be specified after a billing event to check if the "Event_Qualifier='M'", where 'M' is the Insurance Type for Medicare.

Inquiry Tasks and Manual Documents

In the examples provided this far, all tasks were the result of the workflow software dispositioning or "scheduling" activity based on designated conditions. In reality, not all work can be "scheduled" by the system. Depending on the nature of the work, many work "tasks" in an operation are initiated by external factors. Take for example an incoming telephone call from a patient. This type of work cannot be performed from a "work queue". Rather, it is initiated by the incoming call, which requires an end-user to do an account "Inquiry" to access the patient's account Thus the term "Inquiry Task".

Although the workflow software does not initiate inquiry tasks, they are still very much a part of the workflow if the result or "outcome" of performing the task can have an impact on the next step. Inquiry tasks are represented on workflow diagrams as task symbols that are not referenced by other symbols (i.e., no incoming connector lines).

Take for example the process of working EOBs. An EOB or "Explanation of Benefits" is the document returned by an insurance company when paying or denying a bill. In a typical hospital operation, the "Cash Posting" department first uses the EOBs to "post" payments and denials to patient accounts in the billing system. EOBs are then forwarded to the billing department where they are reviewed and "worked". This "working" of payments and denials is driven by the "pile" of EOBs in the billing unit. Since the order of EOBs in the pile can't be predicted by the system, each account is accessed with an account inquiry using the information from the EOB.

Figure 6:
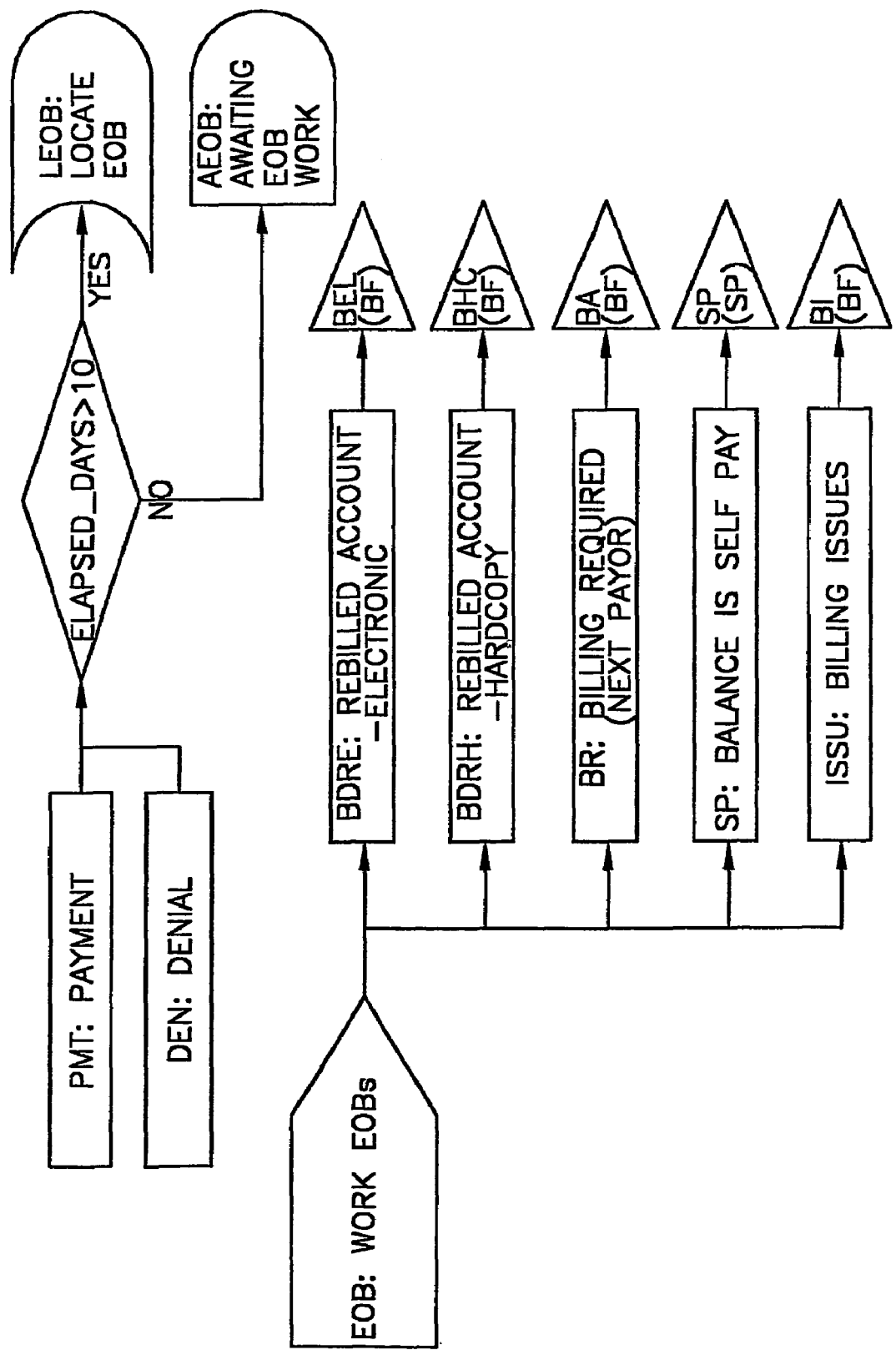
FIG. 6 illustrates a workflow diagram of a separate track related to the workflow of FIG. 5 in accordance with one embodiment of the invention.

FIG. 6 contains the "Work EOBs" inquiry task. Upon designating the need to perform an inquiry, work management interface data 430 provides a list of valid "inquiry tasks". It builds this list by determining which task entries in Workflow Rules data store 140 are not referenced by any other entries. The user selects "Work EOBs", and the interface provides the search screen enabling the user to do account inquiries. Upon completion of the work, the Work Manager 420 prompts the user with the list of outcomes for the "Work EOBs" inquiry task.

Figure 10:
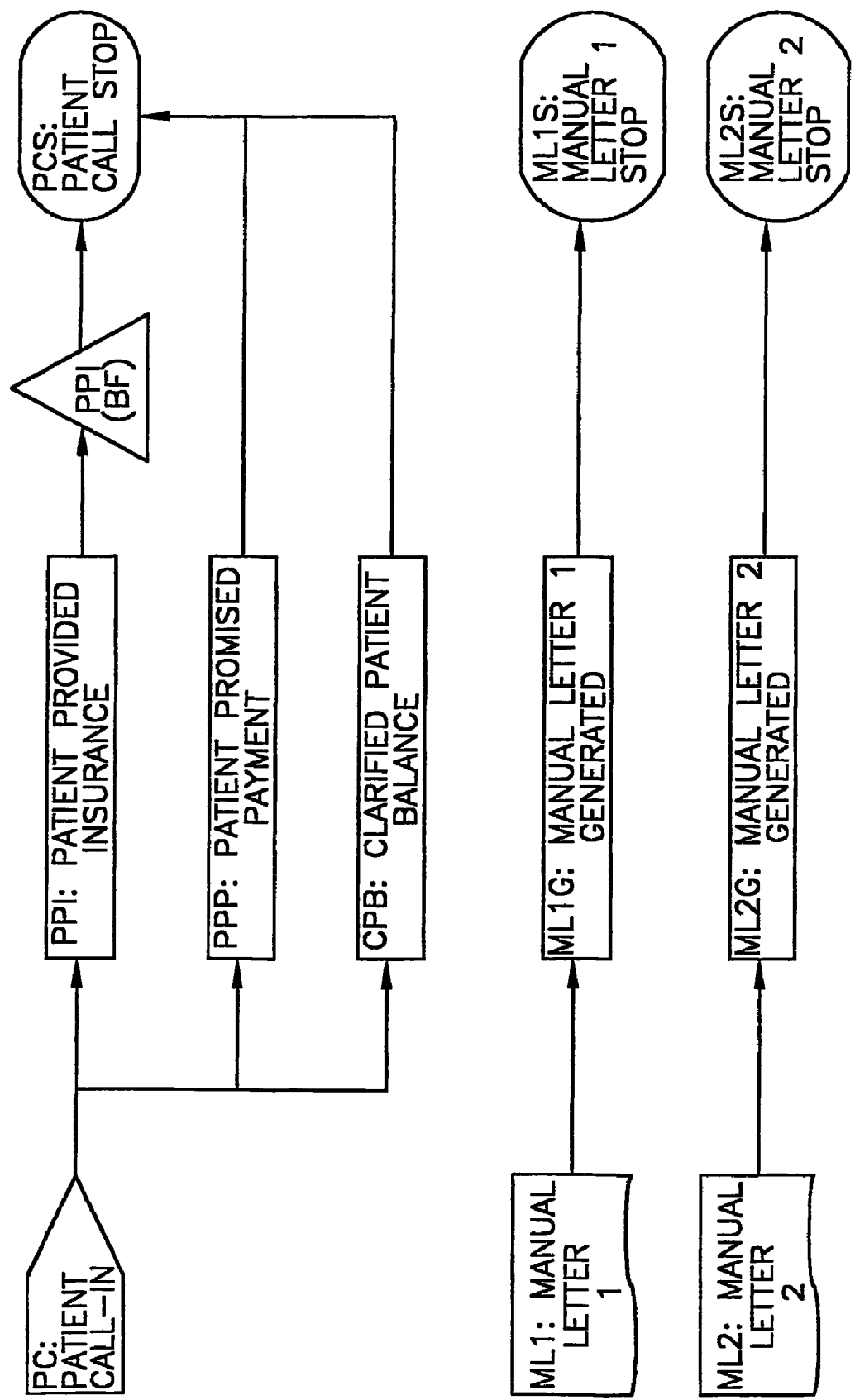
FIG. 10 illustrates a workflow diagram for a third track relating to FIG. 5 in accordance with one embodiment of the invention.

A similar feature is the use of "Manual Documents". FIG. 10 identifies 2 document symbols which are not referenced from another workflow symbol. If the Work Manager has letter generation capability, documents can be manually initiated by end-users 440. Work manager 420 might achieve this capability through its integration with External Technologies 610 by providing the identifiers and any text manually added by end-users 440.

As other disposition types are added, they might lend themselves to the same type of workflow and diagramming rules, where if the disposition is not referenced, the work was initiated from the symbol representing the disposition. A good example if this might be an email. If a disposition type of email was added, an email referenced by another workflow entry would be system generated for those entries in the population with that disposition. If the email disposition is not referenced, this would indicate that the email is to be initiated by End-User 440.

Tracks

As discussed throughout the examples thus far, workflow diagrams determine the disposition based on the most recent event. In the examples, workflow is "sequential" and "singular", in that a new event supercedes the previous event, and a single task, document or process can be scheduled as a result of this most recent event. In many complex operations, multiple work actions may be required concurrently. To accommodate this, the workflow method provides the ability to have multiple work "tracks" active concurrently.

Consider the billing follow-up task example discussed earlier in reference with FIG. 5. After any billing event, follow-up tasks are generated at periodic intervals. The first condition following a "BDIE" event determines if 60 days have passed since the original bill. If 60 days have passed, it may be beneficial to obtain patient's assistance in getting payment from their insurance company. The "PA" track pointer initiates the "Patient Assistance" track. Notice that the connecting lines continue after the track pointer. This is because a disposition has not been reached in the current track. Track pointers may be "inserted" on any connecting line at any point during the workflow when activity should be initiated in a different track.

Figure 9:
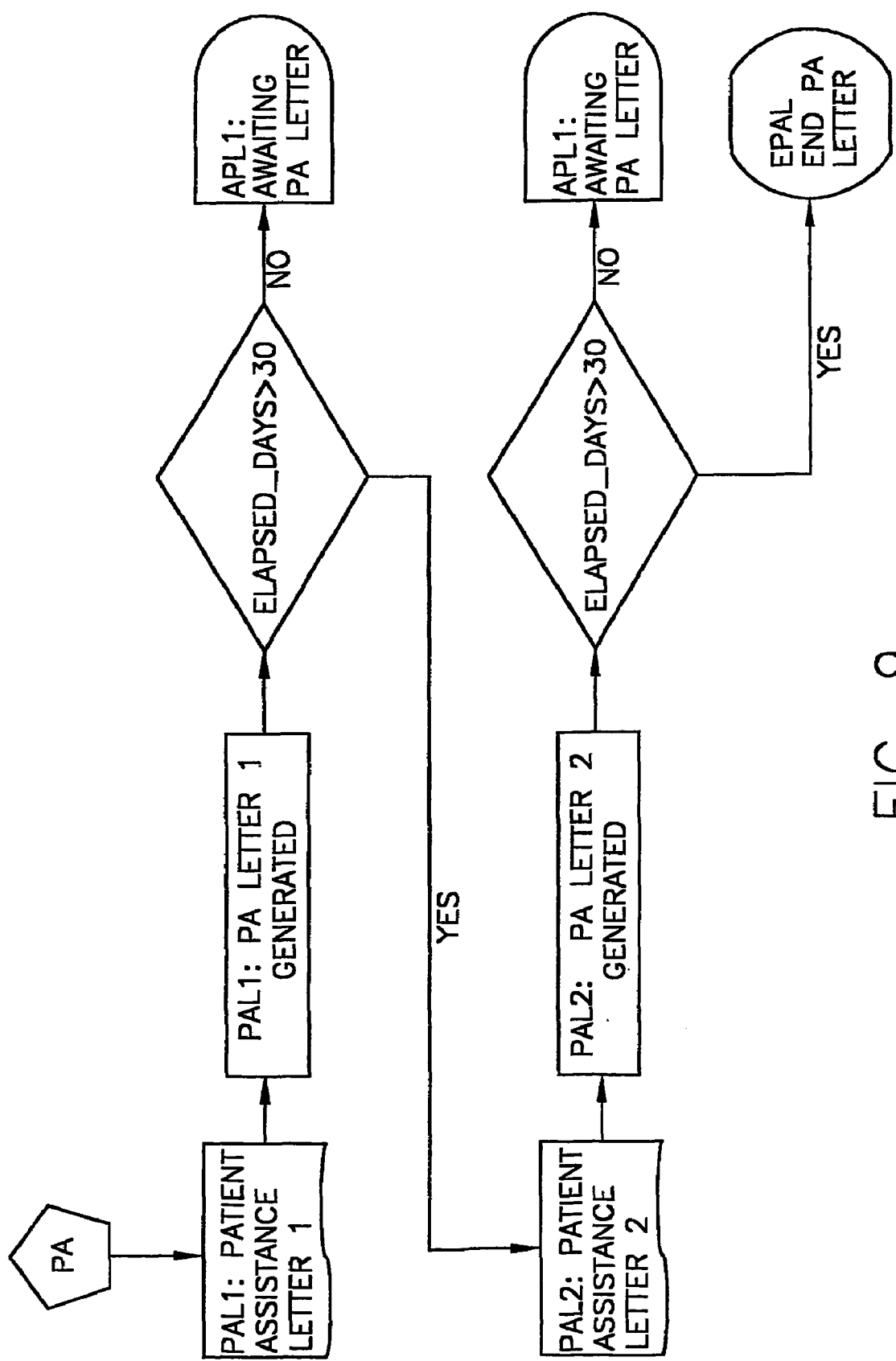
FIG. 9 illustrates a workflow diagram for a second track relating to FIG. 5 in accordance with one embodiment of the invention.

FIG. 9 contains the diagram comprising the "PA" track. This workflow sends 2 letters to the patient at a 30-day interval.

Yet a third track is the "PC: Patient Call-In" track represented on FIG. 10. This track contains the single inquiry task of a "Patient Call-In". One reason for establishing a separate track is so that work performed, which are represented as events logged, do not "override" events in the primary track. Notice that the "PPP" and "CPB" outcomes reference a stop symbol. Although they may be relevant from an audit trail prospective, they have no real consequence to the workflow, and therefore reference the stop. Since the workflow method considers the most recent event in determining the next step, if the "PC: Patient Call-In" task were in the primary track, the "PPP" or "CPB" event would override the previously logged event, which has direct impact on the primary flow. This illustrates the significance of the determining which events belong on which tracks when designing the workflow.

Back to the "PC: Patient Call-In" workflow on FIG. 10. If new billable insurance information is provided by an incoming patient call, the "PPI" Track Pointer is used to initiate activity in the primary track. This is because obtaining new billable insurance is an event which should "disrupt" the primary track, which may have been in a disposition of scheduled for a "Bill Follow-Up" task. The Workflow Administrator 100 has determined that the new insurance should be considered, regardless of other work being performed in the primary track.

In the main billing follow-up flow on FIG. 5, the "PPI" Track Connector references the Bill Account task. From a standpoint of workflow and diagramming rules, a track connector is similar to an event. It must eventually lead to a disposition, potentially through other connectors. Since track connectors and events both lead to dispositions, and there is only one valid disposition per track, the workflow software needs to know which disposition to use when a track connector is initiated from another track, the disposition resulting from the track connector, or that which results from the most recent event in the previously active track. This illustrates the "weight" feature implemented with track connectors. In establishing track connectors, the workflow method requires a "weight" to be specified. The most recent event in the track is assumed to have a weight of "0". Therefore, track connectors must have a positive or negative integer value, but may not be "0", and may not be the same as other incoming track connectors on the same track.

In the "Patient Call-In" example, regardless of the other events logged in the primary track, it is critical to consider the new information obtained from the patient call-in. This connector therefore has been given a weight of "+1". In the Patient Assistance letter series discussed in our first track example, the weight of the "PA" connector has been set to "−1". This is because once the letter series is initiated, the events within the "PA" Track should take precedence over the track connector. If the weight were positive, the "PA" letter series would be re-initiated each subsequent time the billing follow-up condition is checked in the primary track.

The workflow and diagramming methods provide the ability to have an unlimited number of tracks active at any given time. In effect, it provides the ability to implement "multi-dimensional" workflows with numerous concurrent activities being performed. Tracks may reference one another through track pointers and connectors, or may exist as completely independent workflows if appropriate.

Multiple "Workflows"

Another application of tracks is where the applicable workflow depends on the characteristics of the account. All examples utilized thus far are applicable to accounts with open balances. However, it is not unusual for an account to have a credit balance (i.e., a negative balance) resulting from an overpayment or from a payment applied to the wrong account. A completely different workflow may be applicable to credit balance accounts. To accommodate this, the workflow method requires tracks to be "registered" with a "track manager" functionality as configured in dispositioner 260.

The track manager groups tracks into different "workflows". These workflows tell workflow software which primary track is "active" based on characteristics of the account. Any number of mutually exclusive workflows may be specified with the track manager. Accounts comprising each workflow are specified in Boolean expressions using workflow variables. In the healthcare-billing workflow embodiment, the following workflows have been established:

Primary Other

| WF # | Boolean Expression | Workflow | Track | Tracks | Initiate Event |
|---|---|---|---|---|---|
| 1 Reinstated | Balance > 0 | Open Accounts | 1 | 2, 3 | Account |
| 2 Detected | Balance < 0 | Credit Balance Accts | 20 | n/a | Credit Bal |
| 3 Closed | Otherwise | Closed Accounts | 30 | n/a | Account |

Expressions are evaluated in order, as if they were the conditions from a case symbol. In accordance with one embodiment of the invention, a visual technique for specifying workflows (e.g., a case symbol) is provided. In the above specification "Open Accounts" comprise the account population applicable to all workflow examples thus far. "Credit Balance Accounts" are the next category of accounts for which a separate workflow is applicable. The "Otherwise" condition will apply to Accounts where the Balance is $0. Track numbering is completely arbitrary, and is user-defined when the track is created.

As discussed, only one workflow may be active at any point in time. As account API variables change, the workflow software requires that only the current workflow can have dispositions to assure this integrity. This is a very useful feature with respect to "designing" the workflow. For example, if a "Bill Follow-Up" Task is scheduled in the "Open Accounts" Track Category based on a billing Event when the balance was positive, and the balance goes to $0, all "Bill Follow-Up" dispositions (e.g., tasks) will be automatically deleted by the workflow software. This makes sense since there is no longer a Seed to follow-up on the account because the balance is now $0.

Note that each workflow has a primary track. This track is assumed to be what is in essence, the main track for each workflow. Another integrity check performed by the workflow system 10 is to ensure that the primary track for the current workflow is active. If it is not, the workflow system automatically activates it by logging the event designated as the "initiate event", and determining the disposition from this newly logged initiate event. This is useful for detecting unanticipated changes in status such as when an account is reinstated (i.e., an account was closed, but a balance was reestablished).

The primary track is the main track utilized in performing a disposition analysis depicting a breakdown of the dispositions of all accounts in the workflow. Analysis of accounts in non-primary tracks is also useful for identifying the number and statuses of accounts within other tracks.

The ability to have multiple active workflows gives the workflow designer yet another for differentiating the flow of work within the workflow and diagramming method. For example, if the flow of work for inpatient accounts is different from the flow of work for outpatient accounts, the workflow designer has numerous options available for accommodating the distinction. Conditions may be placed in the diagrams, which branch the workflow in different directions for inpatient and outpatient wherever they differ. Qualifiers may be utilized to differentiate dispositions (e.g., tasks). With the ability to support multiple workflows, yet a third alternative is available. If the differences are significant enough, inpatient accounts may be placed on a completely independent workflow from outpatient. This new option combined with other options discussed provides tremendous flexibility in "crafting" the workflow design, which translates to tremendous power in the in adapting this solution to even the most complex of operations.

Healthcare-billing Workflow Diagrams

Throughout this text, references have been made to the billing workflow diagrams to illustrate characteristics and features of the diagramming technique. An explanation of each diagram follows to provide a full prospective of how the overall billing operation is controlled by the diagrams in accordance with one example of various embodiments of the present invetnion.

FIG. 5 illustrates the process of a Billing Follow-Up. This is the first of four diagrams comprising "Track 1: Billing Follow-Up", the primary workflow track for "Open Balance" accounts. The top section is the main billing follow-up "loop" discussed earlier in the text. Different events are utilized to designate whether the "Initial Bill Drop" is electronic or hardcopy. For Electronic bill drops (BDIE), the "WAIT" temporary variable is set to 21, and for Hardcopy bills, it is set to 28. This WAIT variable is used in the "Elapsed_Days>=WAIT" condition to tell the software the number of days to wait before scheduling a "BF: Bill Follow-Up" task. Electronic bills are followed up sooner because they generally pay sooner. Before the "Elapsed_Days>=WAIT" condition, the diagram first checks to see of the "Patient Assistance Letter" track should be initiated to solicit the patient's assistance. If "60 Days Since Originally Billed?" is true, and "Current Payor Commercial or Blue Cross" is true, the Patient Assistance Letter series is "launched" on a separate track. Patient assistance letters advise the patient that the insurance company still has not paid, and solicits the patient's assistance in getting paid from their insurance company. If the "payor" is not Commercial or Blue Cross, the "PA" track is not initiated because the patient cannot provide assistance with other payers (e.g., Medicare, Medicaid).

Whether or not the PA track is initiated, the workflow checks if sufficient time has passed since the billing event. If so a "BF: Billing Follow-Up" task is scheduled. If not, the account is in the "Awaiting Payment" pause disposition. Note that the "BF" task is qualified by "Patient_Type" concatenated with "Insurance_Type" of the billed insurance as discussed in the "Disposition Qualifiers" section. Therefore, "BF" tasks will be segregated to accommodate the billing group departmental organization, enabling billing staff, who are specialized by these categories, to assign the work within their specialty by Operational Management 480 using Work Manager 420. The "AP" pause is also qualified by these same fields, enabling evaluation of dispositions to provide greater detail in terms of what types of bills are outstanding.

Outcomes of the BF Task Include:
NFR: New Follow-Up Required": End-Users 440 should choose this event if the payor tells them to expect a response in a given timeframe. The wait attribute is enabled, which requires the user to specify the number of days to repeat a follow-up if the payment has still not been received. It is noted that if a payment or denial is received, the account will be re-dispositioned "out" of this main billing loop, since payments and denials are represented as primary track events within this workflow (as will be discussed on FIG. 6). If this "NFR" event is selected, the "USR" pointer references the "USR" connector to the left, which sets the value of the "WAIT" temporary variable to the value specified by the user.

"BDRE: Rebilled Account—Electronic": Users should choose this event if, as a result of the follow-up, the account was rebilled electronically. The "BEL" pointer references the corresponding connector, which follows the same path as the "BDIE" event discussed earlier.

"BDRH: Rebilled Account—Electronic": This event is the same as the "BDRE" event, except for hardcopy rebills.

"BR: Billing Required (Next Payor)": Users should choose this event if the payor for which the follow-up is being conducted is not going to pay, and there is another payor listed on the account which can be billed, but this billing is to be performed by a different user. The "BA" pointer references the "BA" connector on the same page, which results in the immediate scheduling of a "BA" task. The "BA" event has been set-up to be qualified by Insurance_Type. This requires users to select the insurance type of the next payor. The "BA" task is qualified by "Patient_Type" & "Event Qualifier". "Event_Qualifier" is the automatic variable containing the qualifier selected by the user. This results in delineation of "BA" tasks for optimal work assignment as discussed with the BF task.

"SP: Balance is Self-Pay": Users should choose this event if the payor for which the follow-up is being conducted is not going to pay, and there is no other payor on the account The "SP" pointer points to the "SP" connector on the "(SP)" diagram, which will begin the "Self-Pay" portion of the workflow to pursue payment from the patient "ISSU: Billing Issues": Users should choose this event if there are special circumstances on the account which requires the assistance of another user. This enables the current user to move on to the next account, without getting "stuck" resolving any issues encountered The "BI" pointer references the "BI" connector on the same page, which results in the immediate scheduling of a "MRBI" task. The "ISSU" event has been set-up to be qualified by User. This requires users to select the other user to which the account should be passed. The "MRBI" task is qualified by "Event Qualifier". This results in delineation of "MRBI" tasks by user, and subsequent work assignment by user.

Below the main follow-up "loop" is the "BA: Bill Account" task. This task is referenced from numerous places in the workflow whenever billing is called for. As discussed above, the task is qualified by "Patient_Type" & "Event_Qualifier", enabling work to be assigned accordingly. The "BA" task is also referenced by the "PPI" (patient provided insurance) track connector. This is referenced when new insurance is provided from an incoming patient phone call, and therefore the account requires billing to the new insurance. Note that the weight of the "PPI" track connector is +1, which results in the "PPI" track connector to take precedence over the most recent event in the track for purposes of dispositioning the account as discussed in the "Tracks" section.

Under the "BA" Task is the "MRBI: Mgr Rev—Billing Issues" Task. Most billing related tasks are intended for work by clerical billing staff. As discussed above, the "ISSU: Billing Issues" event is provided as a valid outcome for billing related tasks. This is to ensure that billing staff are not "stuck" on a tasks with billing complexities. Also as discussed, this task is qualified by user for appropriate work assignment.

It is noted that the "BA" and "MRBI" tasks each have subsets of the events discussed as outcomes for the "BF" task The "MRBI" task also references Other Events special event, enabling managers to select any valid event depending on the nature of the problem as discussed in the "Other Events" outcome section.

Finally, the "ARP Account Reinstated" event is the "initiate event" for track 1, which is the primary track for the "Open Balance" workflow. As discussed in the "Multiple Workflows" section, the workflow software automatically logs "initiate events" if there is no disposition in the primary track. Since all accounts start with an initial billing event, this will only happen if the account is closed because the balance had gone to $0, and the "Zero Balance" track is initiated. Then a balance adjustment causes the balance to "reinstate". When this occurs, the "RR: Review Reinstatement" task is generated Similar to the "MRBI" task discussed above, depending on the resolution of the billing issue, a user working the "RR" task may select any event on the track to put the account onto the proper course.

FIG. 6 illustrates the process of working "explanation of benefits" EOBs. This is the second of four diagrams comprising "Track 1: Billing Follow-Up". As discussed in the "Inquiry Tasks and Manual Documents" section, an EOB or "Explanation of Benefits" is the document returned by an insurance company when paying or denying a bill. In a typical hospital operation, the "Cash Posting" department first uses the EOBs to "post" payments and denials to patient accounts in the billing system. EOBs are then forwarded to the billing department where they are reviewed and "worked".

It is noted that the workflow diagrams described herein control the workflow of the billing department. In the healthcare-billing implementation, these payments and denials are detected by interface 310 as a result of the cash posting operation of third party system 330, which is not part of the operation controlled by the workflow diagrams (although it could be).

On the top portion of FIG. 6, the "PMT" or "DEN" events are followed by a condition which dispositions and account in "AEOB: Awaiting EOB Work" for the first 10 days following the posting. As discussed earlier, EOBs are worked utilizing the "EOB: Work EOB" Inquiry task. As billing staff work EOBs, they select new events as outcomes which re-disposition the account.

This diagram is important in illustrating how effective this event-driven workflow method is, in optimizing workflow and ensuring that no accounts can "fall through the cracks". Prior to the PMT or DEN event, the account was likely in an "AP: Awaiting Payment" disposition from FIG. 5. When the PMT or DEN event is logged by workflow interface 220, the account is re-dispositioned to "AEOB" (awaiting EOB work), and therefore, never goes into the "BF: Bill Follow-Up" task disposition. As billers work EOBs using the EOB inquiry task, they log new events as outcomes, causing the account to again be re-dispositioned. If greater than 10 days elapse since the PMT or DEN, the account is re-dispositioned into a "LEOB: Locate EOB" alert. This is because according to Standard Operating Procedures (SOPs), all EOBs are worked within 10 days of the posting. Assuming billers are up to date in working EOBs, these EOBs have, in effect, "fallen through the cracks", and a listing of accounts in LEOB alert may be produced so that the EOBs may be located and worked. If billers fall behind the 10 day SOP, the 10 day criteria may be temporarily revised until they are caught up. The LEOB alert may be qualified by Insurance_Type, allowing accounts with different insurance types to be printed on different lists.

FIG. 7 illustrates a Self-Pay process. This is the third of four diagrams comprising "Track 1: Billing Follow-Up". This section of the workflow is deployed when the patient has no insurance, or when the insurance has paid and there is a remaining balance due from the patient. On the upper left, the "DSP: Discharged Self-Pay" event is logged if there is no insurance when the account balance is first created. If there was insurance, the "BDIE" or "BDIH" events would have been logged as was discussed on FIG. 5. Also on the upper left, the "SP" connecter is referenced by pointers from numerous places in other diagrams when the patient insurance has not paid, or where the payment leaves a balance which is the patient's responsibility.

In either case, the Self-Pay process begins with the case symbol to evaluate several balance conditions. If the "Balance<5", the write-off process is invoked by referencing the "WOFF" diagram symbol. The cost of pursuing payment from the patient may be greater than $5. If the balance is greater than $200, a process symbol is referenced to perform a "MM: Medicaid Match". In reality, many accounts that enter the self-pay logic actually have insurance, which was not obtained when the patient was registered. In many cases, the letters generated from this self-pay process requesting will prompt the patient to call in and provide their insurance, which will subsequently be billed as will be discussed in FIG. 10. Electronic inquiry to a Medicaid database is available, but on a cost-per-inquiry basis. Since only a small proportion of accounts will actually have Medicaid, the criteria of "Balance>200" is used.

To perform a match with a Medicaid database, external technology interface 590 is used. It extracts the population of accounts scheduled for a match in the "MM: Medicaid Match" disposition 580, creating Extract Events data 620 of "MMI: Medicaid Match Initiated". These extract events data are logged by workflow interface 220 which causes dispositioner 260 to re-disposition the accounts to "AMMR: Awaiting MM Resp" disposition. Medicaid matching is performed by external technology 610, which, sends a file to a matching vendor, and receives the match results sometime later, for example the following day. Driver Interfacefile 600 enables the Medicaid matching process to create the file to send for the match.

Upon receipt of the results, Medicaid matching external technology 610 creates one of two possible events for each account matched: "MMN" or "MMY", depending on whether the patient is covered by Medicaid. These Events represented by data 630 are fed back through external technology interface 590, which are subsequently sent to workflow interface 220 as Update Events data 640. The Workflow Interface 220 logs the New Events 230 causing the Dispositioner 260 to re-disposition the account. If "MMN: Medicaid NOT Found on Match", the account is scheduled for the first letter through its disposition of "SPL1: Self-Pay Letter 1". This is also the disposition referenced by the "Otherwise" clause of the case symbol, when the account balance is between $5 and $200. If the "MMY: Medicaid Found on Match", the "BA" pointer is referenced on the "(BF)" diagram from FIG. 5, which results in the account scheduled for "BA: Bill Account" using the new Medicaid information found from the match.

In short, accounts which fit the criteria for matching are first dispositioned in a pause of "AMMR: Awaiting MM Resp" (FIG. 7) until the match results have been logged. Match results are logged by importing one of two possible events, resulting in either a task of "BA: Bill Account", or a scheduled letter of "SPL1: Self-Pay Letter 1".

In continuing on through the diagram, a letter "series" of three consecutive letters are sent at 20 day intervals, each letter of increasing urgency. As each letter is mailed, an event ("SP1G" through "SP3G") corresponding to self pay "1" generated through self pay "3" generated, is logged which dispositions the account in pauses of "ASL(n): Awaiting SP L(n)", until the 20 day criteria has expired. Note that while the condition "text" reads "20 Days Since Letter (n)?", the specification for each condition is the Boolean expression "Elapsed-Days>20". If during an one of these intervals (a total interval of 60 days), the patient calls in and provides insurance (to be discussed in FIG. 10), or a payment is received, this new event will be logged causing the associated re-dispositioning of the account, which will also have the effect of stopping the letter series, since the most recent event will no longer be "SP(n)G".

Upon completion of the letter series, and expiration of the final 20-day wait, the account is dispositioned as "RCL: Refer for Collection". Again, external technology interface 590 creates a Driver Interface 600 data, but this time the "External Technology 610" might be a process for interacting with a collections agency (not shown). Depending on the logistics of the agency referral process, the process of referring accounts may vary widely. Eventually the account balance will be adjusted off with an agency write-off, and taken off of the active accounts receivable. When this happens, the balance will go to $0, and the "Closed Account" workflow will be initiated by the Dispositioner 260, which will also remove the "ACRF: Awaiting Collection Referral" disposition since the account is no longer in the "Open Accounts" workflow. If after 15 days this has not taken place, the account has apparently "fallen through the cracks", so the account is re-dispositioned to a "RCR: Review Coll-Ref" alert, enabling a list to be generated to determine the problem.

FIG. 8 illustrates the process of Write-Off Accounts. This is the fourth and final diagrams comprising "Track 1: Billing Follow-Up". As discussed in the "Dispositions" section under process, write-offs might be initiated through a batch process utilizing the External Technology Interface 590, which logs a "WOE: Write-Off Initiated (Electronic)", and passes a Driver Interface 600 file back to the billing system depicted as the Third Party System 330, which in this case, also represents the External Technology 610 in the Data Flow Diagram. Similar to the collection referral described in the Self-Pay diagram above, if after 10 days the account is still open, a "WO: Write Off Account (Manual)" task is scheduled by the Dispositioner 260 enabling an End-User 440 to review the account and manually write-off the account selecting a "WOM: Write-Off (Manual)" event, or select other events in the workflow due to the presence of the Other Events special symbol.

FIG. 9 illustrates the process of Patient Assistance Letters. This diagram was discussed in the "Tracks" section. It represents the entire workflow comprising the second track for the "Open Accounts" workflow. It consists of sending a 2 letter series to the patient, requesting assistance in obtaining payment from their insurance company. It was set up as a separate track since it occurs concurrently and independently from the primary billing follow-up track. If the letters result in a patient call-in, this occurs on yet a third track discussed in the next diagram, so as not to disrupt the activities on this or the primary track.

FIG. 10 illustrates the process of Patient Call-In. This diagram was discussed originally in the "Tracks" section and again above. It represents the entire workflow comprising the third and final track of the "Open Accounts" workflow. If a patient calls in, an inquiry task is used to access the account. It was placed on a separate track so that the "PPP" or "CPB" events do not supersede the events logged in Tracks 1 or 2. If however a patient supplies new insurance information, a "PPI: Patient Provided Insurance" event is logged, and the "PPI" track pointer is used to initiate a "BA: Bill Account" task on the "(BF)" diagram as discussed in the "Tracks" section.

Figure 11:
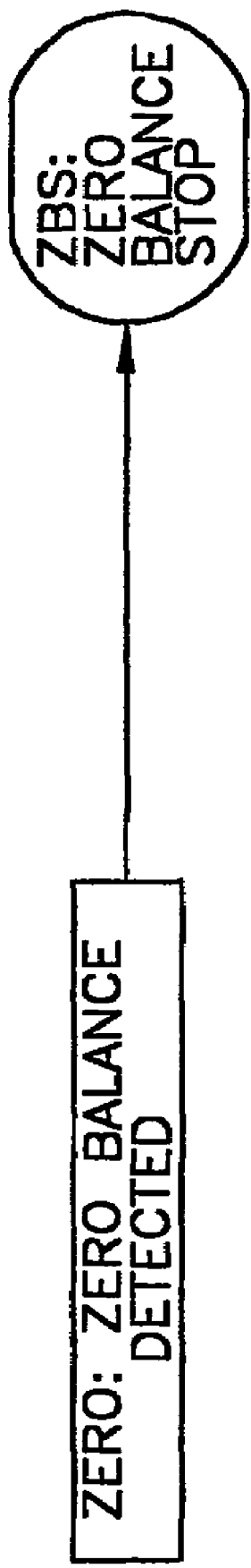
FIG. 11 illustrates a workflow diagram for a fourth track relating to FIG. 5 in accordance with one embodiment of the invention.

FIG. 11 illustrates the process of Zero-Balance Flow. This diagram represents the entire workflow comprising the "Closed Accounts" workflow. In essence, once an account goes to zero balance, no further work is required, so the stop symbol is immediately referenced.

As discussed in the "Multiple Workflows" section, this workflow is first activated when dispositioner 260 detects a $0 balance, which causes it to automatically log a "ZBD" event. It also automatically removes all other dispositions from the "Open Accounts" or "Credit Balance" workflows since those workflows are no longer active.

Figure 12:
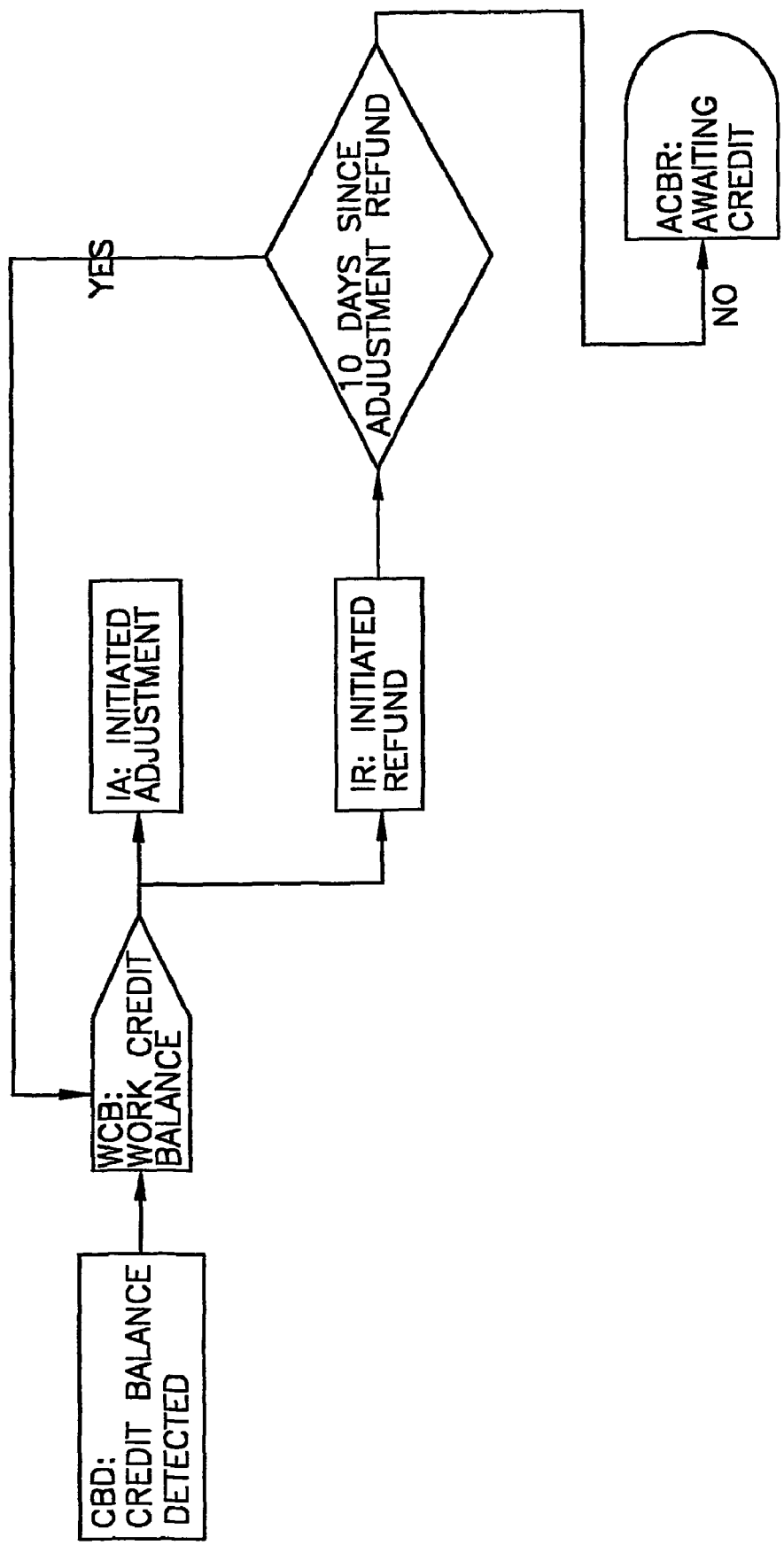
FIG. 12 illustrates a workflow diagram for a fifth track relating to FIG. 5 in accordance with one embodiment of the invention.

FIG. 12 illustrates the process of Credit-Balance Flow. This diagram represents the entire workflow comprising the "Credit Balance Accounts" workflow. If an account balance goes to negative, the Dispositioner 260 automatically logs a "CBD" event. A "WCB" task will be generated to determine the resolution. Once an adjustment or refund is initiated, it will be followed-up with another WCB task in 10 days if the credit balance still exists.

Subroutines

It is appreciated that the workflow and diagramming methods described in accordance with various embodiments of the invention are not limited in scope to the dispositions and events described herein. For example, new dispositions can be introduced as new technologies are developed. Furthermore more informative symbols may be used as desired in various embodiments of visual workflow interface 160. Diagrams can also be enhanced to visually designate which dispositions are qualified, and, what the specification of the qualifier and order by disposition parameters are.

Another embodiment of workflow system 10 includes a subroutine feature, which was introduced in the "navigation using Connectors" section. In accordance with one embodiment of the invention, a subroutine is a section of logic that may be executed from numerous places in the logic flow, and when completed, logic flow returns to the next entry in the logic flow from which it was executed (or next symbol of the diagram in this case).

Figure 13:
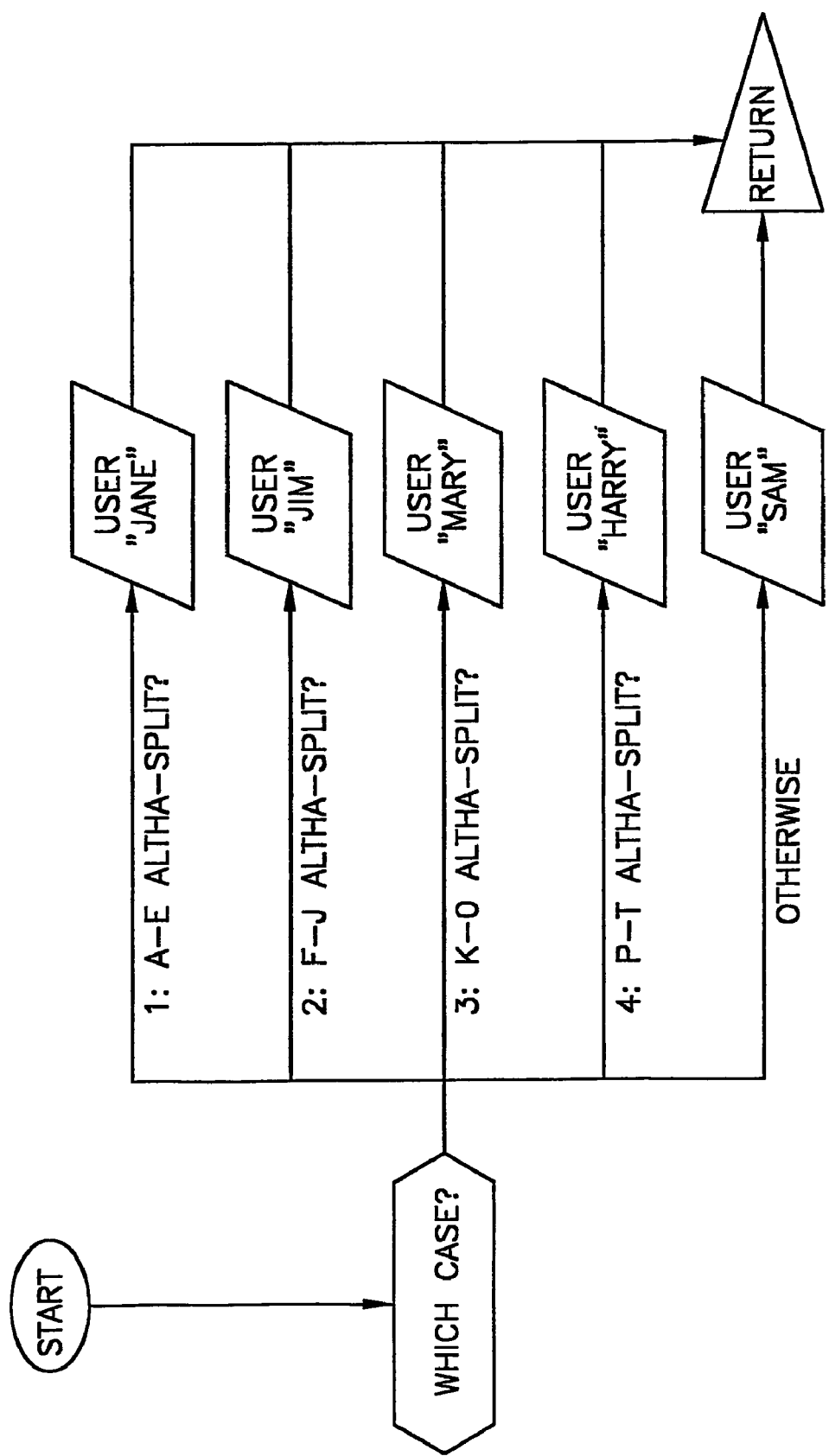
FIG. 13 illustrates a workflow diagram of a subroutine in accordance with one embodiment of the invention.

Suppose that rather than delineating workflow by Patient-_Type & Financial_Class as used throughout the examples in this text, workload was divided among end-users based on an "Alpha-Split" of the patient's last name. FIG. 13 contains an example of an "Assign" subroutine which may be utilized for this purpose. Based on the first digit of an API variable containing the patient's last name, a temporary variable "USER" is assigned the name of the user who will be responsible for working the account. Within the specification of each connector, an "AlphaSplit" function is used to determine the split based on the patient's last name. Note the pointer designated as "Return". This tells dispositioner 260 to return to the next workflow symbol following the subroutine symbol that invoked the subroutine. Therefore, if the subroutine is invoked form several places in the workflow, it may return to different places when it is invoked. Note that a different symbol is likely to be utilized for a subroutine return when this feature is developed.

A new symbol would be introduced and placed in one or more places on workflow diagrams, wherever the work assignment is required. For example, in FIG. 5, just prior to the "BF" task, the "Assign" subroutine might be inserted. If the Elapsed_Days criteria were true, the "ASGN: Assign" subroutine would assign the value of the USER variable, and then the "BF" task may be qualified by the USER variable. If it is desirable to delineate the "AP" pause by the USER, the "ASGN" subroutine would be placed prior to the Elapsed_Days condition.

The same "ASGN" subroutine might be inserted on FIG. 6 either before or after the Elapsed Days criteria, so that "LEOB" work lists may be qualified (delineated) by the user responsible for the EOB, and so on.

Figure 14:
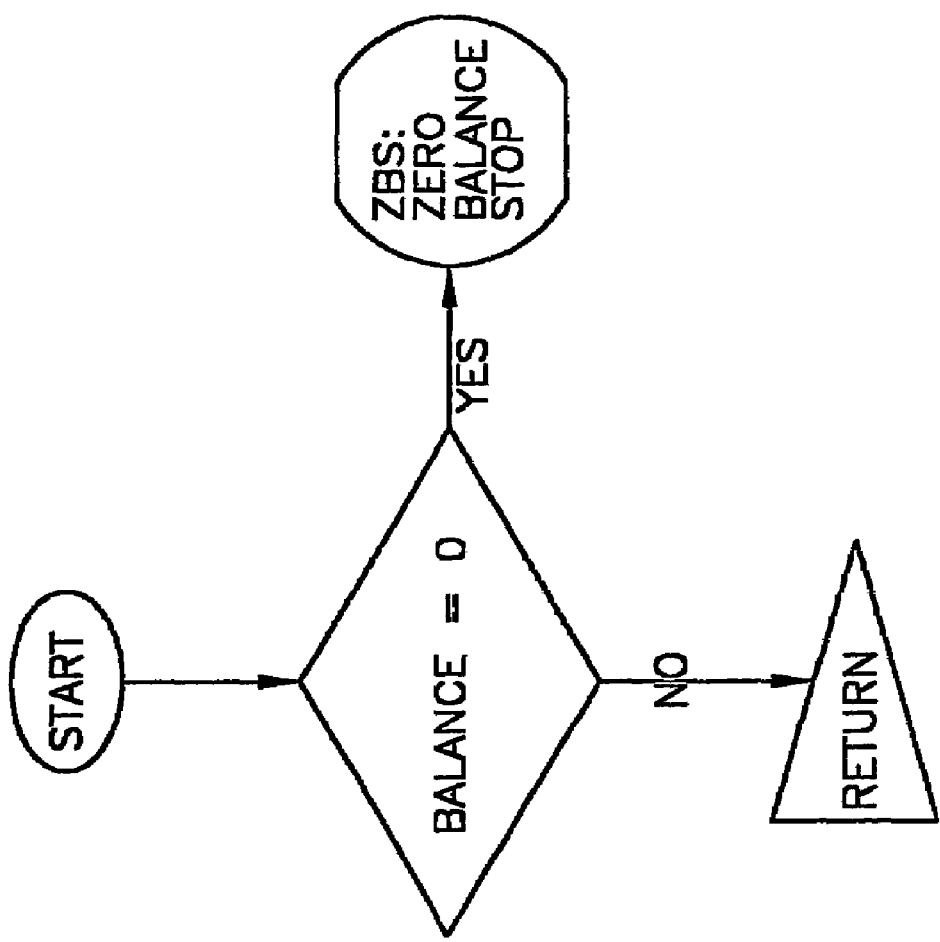
FIG. 14 illustrates a workflow diagram of another subroutine in accordance with one embodiment of the present invention.

In accordance with another embodiment of the invention, the workflow system includes the designation of an "autoexec" subroutine to invoke after every event in the workflow, without having to explicitly insert a subroutine symbol on the diagrams. Separate autoexec subroutines might be specified for each track in the workflow. For example, instead of excluding $0 balance accounts from the "Open Accounts" workflow with a "Closed Accounts" workflow, the "DTB: Detect Zero Balance" subroutine in FIG. 14 is designated as the autoexec subroutine for Open Accounts. Regardless of the most recent event on the account, the "DTB" subroutine would be invoked first. The "DTB" autoexec achieves the same result as the separate "Closed Accounts" workflow, in placing $0-balanced accounts in a stop disposition so that no further work is performed.

Autoexec subroutines have any number of uses, including the potential for performing assignments as in the "ASGN" subroutine above for situations where assignments are required for use with most (or all) dispositions referenced in the workflow.

Workflow Rules 140 Table

Referring back to FIGS. 2a through 2d, workflow rules data store 140 contains information that controls the workflow system in accordance with one embodiment of the invention independent of the diagramming method which has since been introduced. An important feature of the principles of the present invention is the ability to optimize workflow through a relatively straightforward approach of dispositioning all entities in a population based on the most recent event utilizing tracks, workflow variables, qualifiers, and the other features described herein, and driving work off of the dispositions. This may be achieved with or without the diagramming method. In fact as discussed earlier, the diagrams comprising the workflow are compiled into workflow rules data store 140, which is accessed by work manager 420 and by external technology interface module 590 to drive workflow.

The diagramming method, however, is also an important feature of the present invetnion because the visual representation of the features of the workflow method makes them much easier to comprehend. Indeed this is one of the strengths of the diagramming method relative to deploying the workflow method strictly from tables. The remainder of this section itemizes these features, and demonstrates how they are achieved utilizing the workflow rules table introduced earlier in FIG. 2. It is noted that the physical layout of the table is only one embodiment of workflow rules data store 140, and the invention is not limited in scope in that respect Actual physical implementation of workflow rules may vary widely based on design considerations, technology platform, etc.

FIG. 2c corresponds to the diagram in FIG. 5 as represented in the workflow rules table. As discussed earlier, symbols from workflow diagrams are represented as entries in the table. The "Type" and "Sub-Type" columns designate the type of entry, which translates to the type of symbols represented. As can be seen immediately, the diagrams are much more "user-friendly" than the table, which is more "computer-friendly". As discussed earlier, one main purpose of the table is to enable dispositioner 260 to determine the disposition based on the most recently logged event. If the most recent event is a "BDIH: Initial Bill Drop—Hardcopy", the dispositioner performs the following:

It first sequentially navigates through table entries until it finds an entry with "Type" of Event, and "Specification" beginning with "BDIH %", corresponding to the event code field. This entry can be found in the row with "Id" of 29.

From an event, it navigates to the next entry referenced by the value of "Ptr1". This entry "Id" of 17 which corresponds to the "BHC" connector on the diagram.

From a connector, it navigates to the next entry referenced by the value of "Ptr1". This entry "Id" of 18 which corresponds to a variable entry (as seen on the diagram). For a variable, it sets the temporary variable referenced in the "Text" column of "WAIT", to the value of specified in the "Specification" column, which is 28 in this case. The "WAIT" variable may now be used at a later point through the navigation if and when it is referenced.

From the variable, it navigates to the next entry referenced by the value of "Ptr1". This entry "Id" of 4 which corresponds to the condition "60 Days Since Originally Billed?".

From the condition, it evaluates the Boolean expression specified in the "Specification" column. If the expression is true, it navigates to the table entry referenced by "Ptr1". If false, it navigates to the table entry referenced by "Ptr2".

Assuming the expression is false, it navigates to table entry 7 to find another condition "Elapsed_Days>=WAIT". Note that the WAIT variable was set to 28 earlier through the navigation. The "Elapsed_Days" Automatic Variable 270 is obtained from the Events & Dispositions 290 data store by obtaining the date of the most recently logged event, and determining the number of days from the current date. If the condition is true, it navigates to the table entry referenced by "Ptr1". If false, it navigates to the table entry referenced by "Ptr2".

Assuming the expression is true, it navigates to table entry 8 to find the task "BF: Bill Follow-Up.

At this point, navigation stops because dispositioner 260 has found the disposition of the account.

It is noted that the "Specification" column contains a string of information. In this embodiment of the table, attributes of different symbol types are stored in the "Specification" column, delimited by percent signs ("%"). For a task, the first attribute is the task code. Next is whether or not the task is qualified. If "qualified" (i.e., Q=Y), the qualifier type is identified (i.e., QT=PTFC). A separate qualifier type table is stored in workflow rules data store 140 containing the coded values and descriptions for qualifier type of "PTFC". The next attribute of the task following the next "%" is the specification of the qualifier value. Dispositioner 260 obtains the API Variable Values 250 of "Patient_Type" and "Financial_Class" from the Workflow Interface 220, and "assembles" the qualifier based on this specification. Following the qualifier specification (on the next line) is the specification for the order by value as discussed in the "Order By" section. This specification is used by Dispositioner 260 to compute the order by value. Dispositioner 260 has now completed its dispositioning by determining the disposition, qualifier, and order by value, and provides a disposition update data 280 to events & disposition data store 290.

The remaining 2 attributes are work rules data 370 used by work manager 420 when tasks are completed. The first is a comma delimited list of table entries corresponding to the events, if any, to present to end-user 440 when completing the designated task. It is noted that the order of the entries coincide with the order of the events as displayed on the diagram. Finally, the "OE=N" attribute tells work manager 420 not to allow the end user to specify any other events than those identified in the list, as discussed in the "Other Events" section. If the other events attribute were set to "Y", a Work Manager 420 function would identify the "other events" by sequentially accessing the table identifying all other events for workflow 1, track 1.

Many of the features of the workflow method discussed throughout this text were illustrated in the above example. Features not demonstrated are as follows:

FIG. 2d contains the section of the table in which the case symbol on the beginning of FIG. 7 might have ended up after compilation. Note that entry 24 from FIG. 2c references table entry 76, which is the "SP" (self pay) connector entry on FIG. 2d. A case condition requires multiple entries on the table, as many entries are there are connectors coming from the symbol. As dispositioner 260 navigates, it evaluates each entry in the same manner in which it evaluates a condition. If the condition is true, it branches to the entry referenced by "Ptr1". If false, it branches to "Ptr2".

The diagram and start connectors work hand-in-hand much like pointers and connectors, in that a connector type of diagram is established as a table entry, and "Ptr1" value references the corresponding start entry, which in turn reference the next entry according to the diagram. Entry 80 on FIG. 2d contains the diagram symbol from FIG. 7, which references the start entry, which has apparently compiled to entry 102.

Entry 6 contains the PA (PALT) track pointer. FIG. 2e contains the section of the workflow rules table, which is where the "Patient Assistance Letter" track might begin had all compiled diagrams in the workflow been included in the Figure. For a track pointer, dispositioner 260 must perform the navigation for the paths referenced by both "Ptr1" and "Ptr2". "Ptr2" is the path that resolves the disposition in the current track (i.e., track 1). "Ptr1" references the entry 128, which is the track connector corresponding to the track pointer in entry 6. Note that in the specification for entry 128, the second parameter is "W=–1". This weight specification discussed in the "Tracks" section, and tells the Dispositioner 260 to disposition this track using this path, only if the track is not currently active. It can tell if the track is currently active by the presence (or absence) of a disposition for this track on the Events & Dispositions 290 data store. If there is no current disposition, dispositioner 260 continues its navigation from 128 to 129, where it reaches a document disposition, and has therefore determined the track 2 disposition of the account. If track 2 were active, the disposition for track 2 would be based on the most recently logged event in the track. Every time the Dispositioner 260 dispositions an account, it re-dispositions all active tracks, and in some cases, initiates new tracks as in this example.

When an End-User 440 selects an event as an outcome, work manager 420 function controlling outcomes determines whether to the event is qualified by accessing the selected event in the rules table, and evaluating the second parameter in the specification column. Entry 25 in FIG. 2c is the "BI: Billing Issues" event. The second parameter in the specification is "Q=Y, QT=USER", which tells work manager 420 the event is qualified (Q=Y), and that the qualifier type is "USER". Work manager 420 may then obtain the list of valid event qualifiers from the qualifier type table, with the qualifier type of "USER" from workflow rules data store 140.

Work manager 420 also controls the wait parameter discussed in the "Event Wait Parameter" section in a similar manner. When an end-user 440 selects an event as an outcome, work manager 440 function controlling outcomes also determines whether to request a wait period from the user by evaluating the third parameter in the specification column. Entry 9 in FIG. 2*c* is the "NFR New Follow-Up Required" event. The third parameter in the specification is "W=Y,1,21", which tells the Work Manager 420 the event requires a wait, and the minimum and maximum wait values are 1 and 21 respectively.

Work manager 420 can also tell which tasks are inquiry tasks, and which documents are manual documents as discussed in the "Inquiry Tasks and Manual Documents" section. It simply obtains the lists of tasks or documents, and determines which (if any) of these are not referenced by any "Ptr1" or "Ptr2" values. Therefore, when the user performs an inquiry, for example, work manager 420 might present the list of inquiry tasks for selection.

Multiple workflows are supported by the table using the "Wf" column. When the track manager discussed in the "Multiple Workflows" section determines which workflow an account belongs to, it then knows which section of the table to utilize for dispositioning, etc.

Subroutines are represented as an entry in the table with a "Type" of connector, and a "Sub-Type" of subroutine. "Ptr1" would reference the start entry of the subroutine. "Ptr2" would reference the "Id" of the next symbol on the diagram following the subroutine symbol, from which the subroutine was invoked. When dispositioner 260 encounters a subroutine entry in its navigation, it saves the value of the "Ptr2", and branches to the value of "Ptr1". It continues navigating from "Ptr1" until it reaches either a disposition, in which case is has completed navigation, or a connector with "Sub-Type" of return, in which case it branches to the saved value of "Ptr2" and continues navigating.

Optimizing Workflow with Disposition Analysis

Now that the "mechanics" of the workflow and diagramming methods have been discussed in detail, it is advantageous to take a more global prospective, and illustrate how workflow is managed, and ultimately "optimized". Previously, the notion of analyzing entities in the workflow population by disposition was discussed. The features of the workflow method discussed since the introduction section provide extensive flexibility in dispositioning these entities, and on controlling work through work manager 420.

FIG. 15 contains a breakdown of all open accounts in a hospital billing operation. For example, in a typical hospital system, there are a total of 6,132 accounts with combined open balances of $12,651,991.41. The Figure breaks these accounts down by "Patient Type" and "Financial Class". A billing group-lead by a billing supervisor may be responsible for billing and follow-up activities on all Outpatient Medicaid accounts. Outpatient Medicaid contains 1,084 accounts with a total of $919,395.66 in open balances (see report line annotated with "→").

FIG. 16 contains a "Disposition Analysis" which breaks these 1,084 accounts down by workflow disposition. These dispositions map directly back to those defined on the workflow diagrams. This analysis gives the billing supervisor the information needed to monitor workloads, set priorities, and establish work assignments.

On FIG. 16, total of 536 accounts are scheduled for work in task dispositions. This represents the workload for the billing group at any given time. If the number of tasks exceeds the number that can be worked, not all scheduled tasks can be worked in a given day. Optimally, the task workload should be slightly greater than the number that can be worked in a day. To remedy this, either the staffing levels can be increased, or the workflow diagrams may be changed. For example, the "WAIT" variable values set on FIG. 5 may each be increased by 15 days. Then the accounts in the "BF: Bill Follow-Up" disposition may be re-dispositioned. This would reduce the number of accounts in the "BF" tasks by moving some of them to "AP: Awaiting Payment" dispositions. These types of changes will only defer work, or at a minimum, will reduce the efficiency of the operation. Since some of the accounts will pay within the additional 15 days without a follow-up call, it has in those cases, reduced the amount of work since the follow-up wasn't necessary to obtain payment. The trade-off is that for those accounts for which the follow-up was necessary to obtain payment or to re-bill the account, payment will be deferred by the additional 15 days waited. Since a primary objective of working a receivable is to secure payment as soon as possible, this solution is not sufficient in the long term.

Optimally, the follow-up should be set at a value somewhat greater than typical number of days required for payment. If electronic bills typically pay between 14 and 18 days after they are billed, and hardcopy bills between 21 and 25 days, then the original 21 and 28 day follow-up "tolerances" might be considered optimal. If the workload is too large at these tolerances on an ongoing basis, the billing supervisor has the empirical evidence required to support a request for additional staff.

The above example illustrates how the disposition analysis works hand-in-hand with workflow diagrams in the workflow implementation process. Similar to the above example, a disposition analysis may be generated for the dispositions across the entire department (i.e., across patient types and financial classes). This gives operational management 480 the tools necessary to monitor the overall workload for the department, and to determine overall departmental staffing levels.

As tasks are worked, events are selected as outcomes by users as prompted by work manager 420, and these new events data 450 are logged to events & dispositions 290 data store through workflow interface 220. This is what causes the accounts to be re-dispositioned once work on the account is complete as discussed in examples earlier in this text.

Furthermore, in accordance with another embodiment of the invention, event history data 360 from event & dispositions data store 290 serve as an audit trail for work manager 420. This audit trail may be used to generate extensive productivity reports of events worked by user, by disposition, and by date.

These productivity reports enable development of performance "metrics" with respect to the number of accounts that can be worked by disposition, and the anticipated mix of events logged. The performance of each Individual end-user 440 can be measured against these metrics. The audit trail may also be used to audit work performed by staff, and to document the history of events logged on an account-by-account basis. The performance metrics also feed into the establishment of departmental workloads, and expectations regarding staffing levels required to work the workloads.

Analysis of accounts by disposition not only facilitates workload balancing, but also illustrates that inherent to the use of this workflow method is the assurance that no account can "fall through the cracks". Since the entire population of accounts has at least one event as enforced through the method, and every event is dispositioned, the disposition analysis shows the workflow status of the entire population being managed. The Workflow Administrator 100 developing and controlling workflow through the development of the Workflow Rules 140 is constantly monitoring the disposition analysis, as is Operational Management 480. This monitoring process not only focuses on workload (e.g., tasks), but on all dispositions to ensure that these sub-populations are at reasonable levels. If errors are made in the Workflow Rules, it is not likely to go undetected for long. Either end-users 440 will be forwarded work which doesn't make sense, or dispositions will have conspicuously high, low, or absent numbers of accounts, which will quickly point out the flaws in the diagrams. Ultimately, "you can't make mistakes".

As disposition anomalies are researched, qualifiers may be exploited to "hone in" on any problems. For example, if an unusual number of accounts are in "AP: Awaiting Payment", the disposition might be temporarily qualified not only by Payment_Type & Financial_Class, but also by Event_Code of the most recent event, which is available as an automatic variable. Upon re-dispositioning all "AP" accounts, the new further-delineated disposition analysis might point out the problem. Work manager 420 also allows "drill-down" access to the details of any disposition population to further diagnose any problems. If there are problems causing some accounts to be incorrectly dispositioned, workflow administrator 100 need only determine the most recent event on the account. The event is then located on the diagrams comprising the active workflow, and the logic path from the event is reviewed which quickly points out the problem.

Even errors by end-users 440 in recording incorrect events do not go undetected for long. All events identify the user who recorded them. These recorded events result in re-dispositioning the accounts, and the errors are generally caught as the account is worked in the next step. If users intentionally and persistently log incorrect events to get through their workload, they are also eventually detected through analyses of events logged by users, and/or by the users performing the next step in the workflow.

As discussed, the disposition analysis works hand-in-hand with workflow diagrams in the workflow implementation process. The disposition analysis is constantly monitored as workflow administrator 100 implements new aspects of the workflow. A "projection" feature in dispositioner 260 enables workflow changes to be projected across the workflow population, and obtain a disposition analysis of the projected workflow. This further enables the Workflow Administrator to "model" and "tune" the workflow. Operational Management 480 monitors workload levels, establish staff assignments, and adjust staffing levels as they monitor productivity. A workflow matures as it evolves towards optimal efficiency. In effect, an "equilibrium" is reached at optimal efficiency when:

All accounts are correctly dispositioned in their optimal workflow status

Tolerance levels have been set to desired levels based on the nature of the business processes being supported Staffing levels are available to support the resulting workload The necessary performance metrics and protocols in place in managing productivity Implementation Approach Another strength of the workflow methodology is that it can be introduced gradually into an environment. There is no need to "convert" an operation to workflow software controlled by the workflow method "overnight".

Upon initial implementation, there is little or no event history from which to determine dispositions. Since end-users 440 log events through recording outcomes, the only events that will exist on the first day are those which can be detected in the interfaces. In the healthcare-billing workflow Figures, the "BDIE" and "BDIH" events from FIG. 5, the "PMT" and "DEN" events from FIG. 6, and the "DSP" event from FIG. 7 are the only events that are "imported" from the interfacing applications. Therefore, it may make sense to deploy a different workflow at implementation, and/or to use longer follow-up tolerances until a sufficient history of events have been logged.

For example, the "Elapsed_Days>=WAIT" condition in FIG. 5 determines the number of days since a given billing event. Upon initial implementation, separate logic may be applied to billing events obtained from the interfaces with event dates prior to the implementation date. If the event date of these events is prior to the implementation date, the accounts might be dispositioned in a "backlog" pause disposition. In accordance with one embodiment of the invention, this may be achieved by adding a condition immediately after the "BDIE" and "BDIH" events to test if the "Event Date" "automatic variable" is less than the implementation date. If so, these accounts are dispositioned in the "backlog" pause. If not, the logic path continues on to the connectors. Only accounts with billing dates since the implementation date will be included in non-backlog dispositions on day 1. The same logic may be added after "PMT" and "DEN" events in FIG. 6.

In reality, follow-up and billing activities have likely taken place on many of the "backlog" accounts, but no events were recorded since the workflow software had not yet been implemented. Follow-up might be set up to be performed 6 months from the initial bill drop to for these backlog accounts to ensure that accounts aren't going too long without follow-up.

Meanwhile, inquiry tasks would be implemented soon into the implementation in order to begin to build a history of Events. As payments or denials are posted or any other activity takes place on backlog accounts, these events have the effect of re-dispositioning these accounts out of the backlog, and into one of the active workflow dispositions. Therefore, as time progresses, the backlog will gradually be reduced. Meanwhile, the End-Users are becoming more experienced with the newly implemented Work-Manager 420 functionality. Eventually as the backlog is reduced, it may make sense to begin reviewing and re-dispositioning at least the higher dollar accounts in the backlog. This can be achieved either by ordering the entire backlog by descending dollar balance and reviewing in the order of this order by priority, or by breaking the higher dollar accounts out into a separate dispositions, and working down these portions of the backlog. Meanwhile, the backlog reduction continues to occur naturally through payments or other activity as discussed.

As the implementation progresses, more and more accounts are reduced in the backlog and moved to active dispositions. Tolerance levels are adjusted accordingly, and the workflow gradually, but inevitably progresses towards "equilibrium" at optimal efficiency as discussed in the previous section.

Workflow Methodology Expandability & Adaptability

The prospective and approach deployed by the workflow methodology is what makes it so unique and effective. The diagramming method itself is very extensible and adaptable. As discussed earlier, additional symbols can be introduced over time as the method and associated use of the software evolves. Any number of symbols and/or additional technologies may be incorporated into the methodology and implemented in any number of applications. It is the overall prospective taken by the workflow method and diagramming technique that distinguishes this methodology. This begins with the premise of dispositioning all entities in the population, includes the notions of potentially multiple workflows, tracks, dispositions, qualifiers, and etc.

"Programming" Workflow

In accordance with various embodiments of the invention, a workflow is programmed from the prospective of what the next step is, based on the most recent activity. Once End-Users 440 are properly trained on work manager 420 interface, workflow can be deployed or "programmed" into an operation very quickly. End-users 440 can be an active part of the workflow design. Their acclimation to the diagramming method will be very intuitive, based on their understanding of the operation in which it is being implemented.

It is noted that unlike other workflow oriented diagramming methods, there is no real "beginning" or "end" to workflow diagrams. Rules dictating the disposition from an event may be completely "disjointed" from others. Different diagrams from the same track may or may not reference one another. Similarly, different tracks within a track category may or may not reference one another.

Accordingly, system 10 makes no attempt to force an operation into compliance with a given operational "model". In this respect, it is very "non-intrusive". It simply attempts to record the steps and capture information about the work performed. The information captured may be used to direct activities where desired. It also uses this information to better manage the overall process by "profiling" workloads and monitoring productivity.

The fact that events, diagrams and tracks may be "disjointed" in this diagramming technique affords some advantages. In modifying or enhancing workflow diagrams, there is less concern about the effects of the modifications on the rest of the workflow. As discussed earlier, any logic flaws will become quickly apparent when the disposition analysis is generated and/or when End-Users 440 begin working from incorrectly generated tasks. These flaws can quickly be remedied by updating the diagram(s), and rerunning re-dispositioning the population. This overall approach enables even very complex workflows to be deployed extremely effectively.

Workflow "Design" Alternatives

As in any "programming" language, the system must first be designed in order to effectively deploy the language. With respect to designing workflow, there are numerous aspects to the design that have been discussed throughout this text. Different Workflow Administrators 100 may program the very same operation differently. As discussed, various features of the method afford alternatives for achieving similar result. Therefore part of the role of the Workflow Administrator 100 is to examine the tradeoffs of the various alternatives, and chose the alternative that would best suite the problem at hand.

Consider a situation where the criteria for determining whether an account is part of a special project, is specified in a Boolean expression in a condition symbol. If the criteria grows more complex, it may be worth creating an additional API variable to simplify the diagram. For example, consider the expression:

Balance>500

& Patient_Type='O'

& (Financial_Class='A'|Financial_Class='B'|Financial_Class='C')

If a "Special_Project-Code" API variable were created by the Third Party System Interface 310 containing the value "Y" if the above conditions were true, the above expression could be replaced with the following expression:

Special_Project_Code='Y'

This does have the drawback of requiring maintenance on the API variable when and if the criteria changes, thereby losing the ability to maintaining the criteria through the diagrams alone. Establishing API variables to detect complex conditions adds tremendous power and flexibility to the overall solution, since even the most complex of conditions can be accommodated using API variables.

As discussed earlier, the combined capabilities and flexibilities afforded by the use of multiple workflows, tracks, conditional connectors, qualifiers and API variables affords tremendous flexibility in terms of alternative ways of achieving desired workflow objectives. This virtually any workflow to be controlled by workflow diagrams.

Other Applications of the Workflow Software

The example utilized throughout this text is that of a healthcare-billing environment where workflow software controls the liquidation of patient accounts. As discussed in the "Workflow System Overview" section, the workflow and diagramming methods are generic, in that it can control workflow on any population of entities. The entity on which workflow is implemented for healthcare-billing is the "patient account". Examples of other potential applications of the workflow software with their respective entities are:

In a distribution implementation, the software can control the fulfillment of "Customer Orders".

In a help desk implementation, the software can control the managing of "Open Problem Reports".

In an insurance adjudication implementation, the software can control the adjudication of "Open Claims".

The Workflow Interface 220 provides for specification of multiple generic keys in identifying the entity. In the above referenced distribution implementation, both "Customer Number" and "Order Number" might be required to uniquely identify the entity "Order", on which workflow is being controlled. Virtually any operation involving managing a population of entities through a combination of manual and automated steps could benefit from the workflow and diagramming methods described in this text In fact, all examples utilized thus far in this text have been with regard to a single entity (e.g., Accounts, Orders) on which workflow is controlled. However, workflow may actually be implemented across multiple entities concurrently. For example, if in a distribution environment, during the order fulfillment process a determination is made that inventory on a specific product is low, a track pointer can be utilized to initiate a task to be worked by the purchasing department to order new product from the vendor. When referencing tracks for different entities, it is necessary to specify API variables available from the current entity, which comprise the unique identifier(s) or "keys" of the entities in the referenced track. Therefore in the distribution environment, the "Vendor Number" and "Product Number" API variables available to the "Customer Order" workflow, would be specified as variables to pass to a track implemented to control the purchasing department workflow. This capability dramatically increases the power of the workflow software, in that it may be utilized to control work across different functional areas throughout an enterprise.

Workflow Re-Dispositioning Logistics

Throughout this text, extensive discussion has been devoted to the workflow and diagramming methods. Additionally, it is noted that dispositioner 260 dispositions the entities of the population at certain time periods. The timing of dispositioner 260 is dependent upon the implementation. In general, dispositioning is performed under the following conditions:

1. Upon recording of any new events
2. Upon update of any API variable values which impact workflow
3. Upon changing of the currently active workflow
4. At least once a day, since many conditions within the workflow will be based on the number of days which have elapsed since the most recent event The initial deployment of the workflow system discussed throughout the text is in a healthcare-billing environment In this initial deployment, a third party system interface 310 runs on a nightly basis to synchronize the workflow software with Third Party System 330. Therefore, in this initial implementation, the above three scenarios are accomplished as follows:

1. As discussed in the "Outcomes" section, work manager 420 requires end-users 440 to select an outcome of performing tasks. Upon recording the outcome, new events are logged through workflow interface 220, which results in the re-dispositioning of accounts.
2. Upon completion of the nightly third party system interface 310, API variables will have updated values. All accounts must therefore be re-dispositioned nightly.
3. Upon activating new/modified workflow diagrams, workflow administrator 100 may initiate re-dispositioning of all or portions of the workflow population depending on the nature of the workflow changes.
4. As discussed in 2 above, all accounts are already re-dispositioned nightly due to potentiaql updates of the API variable values.

Workflow Interface 220

Workflow interface 220 serves to interface the workflow solution with third party systems 330. One of its primary functions is to make API variable values available to dispositioner 260 for the dispositioning of entities. In the healthcare-billing examples, it also performs the translation from "accounts" to entities, enabling dispositioner 260 to be completely isolated from the operation in which it is controlling workflow. It also serves to isolate the work manager from the physical implementation of dispositioner 260 and workflow rules 140.

Implementing this workflow method on entities other than healthcare requires implementing a different workflow interface 220 to the third party systems 330. This is because API variables required to control workflow, for example, in a distribution operation differ from those required in healthcare. Available API variables may be expanded gradually in workflow interface 220 along with the workflow implementation. Once the appropriate workflow interface 220 is implemented, the diagramming technique, as well as the overall workflow methodology is identical across differing operations.

Work Manager 420

As mentioned before, Dispositioner 260 is an important component of workflow system 10. It is driven by workflow rules 140 to disposition entities based on events logged by workflow interface 220. As a result, the workflow population in events & dispositions data store 290 contains the dispositioned entities from which workflow can be driven. It is also necessary to provide data flows to carry the benefits of the dispositioned entities to the operational environment in a way that directs, drives, and controls activities in the operational environment. This is the function of work manager 420.

In accordance with one embodiment of the present invention, work manager 420 employs a commercially available software program called "Escort". Escort is a Windows client/server based software system, which drives an operational work force. To this end, in accordance with one embodiment of the invention, the functionality of workflow rules editor 120, visual workflow interface 160, Dispositioner 260, workflow interface 220, external technology interface 590, and legacy system interface can be built directly into the Escort software.

Escort contains extensive security controlling access to all Escort features by workflow administrators 100, operational management 480, as well as end-users 440. Escort allows operational management 420 to assign dispositions to end-users 440 by disposition type, disposition code and qualifier. End-users 440 perform the work indicated by the dispositions by clicking on the "Next Account" button from the Escort toolbar. When this is done, Escort obtains the Account Number of the account with the next highest priority designated by the Order By value, and passes it to legacy system interface 520. The legacy system interface 520 in turn links End-Users 440 into the account on the hospital billing system depicted as third party system 330.

In accordance with one embodiment of the invention, Escort is configured to include numerous features that facilitate managing and working accounts in various dispositions. For example, if the number of a certain task became too large for one user to handle, multiple end-users 440 can be assigned to the same task concurrently. Each assigned end-user 440 requests the "next account" function independently of one another, and Escort assigns and delivers the accounts to each user independently.

As end-users 440 complete account work, Escort prompts them with the list events as possible outcomes based on the workflow diagrams. Selected outcomes are logged to a work database depicted as the Events & Dispositions 290 data store. Dispositioner 260 then re-dispositions the account.

In accordance with another embodiment of the invention the Escort system is configured so as to allow "drill-down" access to any "slice" of the receivable by disposition, through an access "engine" which provides a list of all accounts in the disposition ordered by the order by value specified in the workflow diagram Users may then link to any individual account directly through legacy system interface 520. This affords tremendous versatility to the workflow administrator 100 and operational management 480 in "evolving" the implementation towards optimal efficiency as discussed earlier in this text.

Work manager 420 as configured in the Escort system in accordance with one embodiment of the invention, also contains extensive functionality in monitoring and managing productivity. Event history data 380 is used as an audit trail in productivity reporting and in monitoring and auditing work performed by end-users 440. Another access "engine" enables operational management 480 to navigate through the event history audit trail of any staff member. This not only improves accountability, but also facilitates and reinforces training of new staff.

It is noted that the block diagram depicted in FIG. 1 can be implemented in any number of physical embodiments by those skilled in the art, and the invention is not limited in scope in that respect.

Another point relates to the overall effectiveness of the solution, provided by this rather unique combination of a workflow method integrated into an operation controlled by a legacy system with a relatively "closed" architecture. In this first implementation, the system obtains data from hospital billing systems through a set of nightly "batch" processes, which extract account information from the billing system and updates its database. This is represented as workflow interface 310 on FIG. 1. The second "point of integration" is the "terminal emulation" feature (i.e., the Legacy System Interface) which "links" to the patient's account in the hospital billing system. This overall approach provides an almost "seamless" integration of a workflow solution with a legacy third party system 330. The workflow interface 220 contains API variable values, which are refreshed nightly by the batch interfaces. These interfaces also import any new events from the billing system from the previous day (e.g., Bill Drops, Payments, etc.). All accounts are re-dispositioned nightly after completion of the Escort update processing. From that point on, work manager 420 features of the design enable operational management 480 to manage workflow.

Overall, the workflow method disclosed herein, combined with the unique implementation approach discussed in this section, is extremely effective in dramatically improving the overall efficiency of the operation, which is results in a corresponding increase in payments received by hospitals from insurance companies and other payers.

It is noted that in accordance with other embodiments of the invention, dispositioner 260 lends itself to a "server" based solution, not unlike a web server or a mail server. This "workflow server" actually refers to a physical implementation in which the workflow server itself would be logically comprised of dispositioner 260, Workflow Rules 140, Events & Dispositions 290, and portions of the Workflow Interface 220. The workflow server interacts with potentially many different implementations of work manager 420, through different implementations of workflow interface 220. Different implementations of a workflow server can be developed, potentially on different hardware platforms and/or with different database software. Again, so long as the compiled workflow rules 140 utilized by dispositioner and workflow interface 220 conform to the same format as was created by visual workflow interface 160 with which it is interfacing.

Workflow interface 220 functions in "transforming" workflow instructions from the workflow server (i.e., the Dispositioner 260) to functional applications, working hand-in-hand with work manager 420. Different physical implementations will be required, at a minimum, for each technology platform that each of the interfacing components are implemented. These different technologies may vary widely from traditional mainframe or client/server technologies directly linked to the workflow server, to "messaging" type applications including Internet technologies, or even widely disparate technologies including non-traditional device based implementations, in which workflow rules 140 are embedded in workflow interface 220 and/or Work Manager 420 components which might operate on these other platforms. For example, a hand-held device could prompt end-user 440 for the list of potential outcomes, which were driven by Workflow Rules 140 originally specified through workflow diagrams. The next time the device communicates with its interfacing application, all events for all entities captured by the device will be communicated back through the receiving platform's implementation of the Workflow Interface 220, which will ultimately be logged, and re-dispositioned on the workflow server.

There may also be many differing implementations of work manager 420. The work manager is essentially an extension of workflow interface 220. While the primary focus of the workflow interface is interfacing, the primary focus of work manager 420 is to manage work within the context of its operational environment. The work manager has the greatest visibility relative to other components with respect to "look and feel" by end-users 440. Different versions may be developed over time, which deploy a wide variety of reporting styles, navigation styles, and so on. A work manager API 570 (i.e., "Application Programming Interface") enables operational third party systems 330 to directly interact with work manager 420 functionality, along with the workflow interface 220 in supplying API variables & events 340. In this manner, work manager 420 functionality may be directly incorporated into third party systems 330.

Even legacy system interface 520 may take on different forms from its current implementation in accordance with other embodiments of the invention. For example, in the current implementation, an inquiry task is performed on Escort, which upon identifying the desired entity, "plays" the scripted keystrokes required to by the Third Party System 330 to access the desired entity. A different version may also be configured which works in the "background" of an emulated legacy system session, and upon detecting a new inquiry being performed on the legacy system, prompts the user with the list of potential outcomes from the previous account being worked.

Upon selection by end-user 440, the new event is logged through workflow interface 220. Once the inquiry is completed on the legacy system, a workflow interface 220 function is invoked to determine the list of valid outcomes of the accessed entity based on the workflow in place for that entity. This communication to and from the workflow server may take place through a "messaging" technology in that a direct link between the Legacy System Interface 520 is not required. One message is sent to the Workflow Interface 220 to log the outcome from the entity upon detection of the legacy system inquiry. This "transmission" does not need to be complete for the legacy system inquiry to be performed.

Upon completion of the legacy system inquiry, a second message is sent to workflow interface 220 to obtain the list of outcomes based on the workflow of the newly accessed entity. Yet a third transmission is performed from workflow server to legacy system interface 520 so that it knows the potential outcomes to present when a new inquiry is detected. Each of these three transmissions may take place independently, thereby eliminating the need for a direct communications link with the workflow server. This same approach may also be deployed when embedding workflow functionality within third party systems 330 as discussed above.

Finally, external technology interface 590, which is also in a sense an extension of workflow interface 220, may have as many different physical implementations as required by workflow interface 220 with which it is communicating, and potentially, as may be required by the external technologies 610.

SUMMARY

As discussed throughout this description, workflow and diagramming system 10 provides tremendous flexibility in driving workflow. Various features of the present invention provide for, among other things, the following capabilities, for which system 10:

Ensures that no work can "fall through the cracks"
  As discussed, since every entity in the workflow population is accounted for, no entities can "fall through the cracks".
Supports an always up-to-date status of the operation being managed
  The disposition analysis will always reflect the current status of the work being monitored.
Provides an audit trail of work performed
  Event history data 390 provided through workflow interface 220 serves as an audit trail of all relevant events with respect to workflow.
Facilitates monitoring and managing productivity
  Event history data 390 is utilized by work manager 420 to perform productivity reporting.
Enables users designing the workflow to "model" workflow through an iterative refinement process
  As described earlier this "modeling" process allows for an iterative refinement process.
Allows errors in the workflow rules to be easily detected
Virtually "guarantees optimal efficiency" in an operation in which this method is implemented intelligently
Can be visually represented in a diagramming method
Can be directly controlled by a diagramming software tool which adheres to the diagramming method, and which captures the rules as specified by a user implementing the workflow method
  The Visual Workflow Interface provides this functionality.
Facilitates awareness and training of operational procedures by end-users
  Workflow diagrams greatly facilitate awareness and training of operational procedures.

What is claimed is:

1. A workflow management process, said process comprising the steps of:
  storing a plurality of workflow rule entries for determining dispositions of a population of entities wherein said dispositions correspond to a status of an entity among said population of entities, wherein at least some of said dispositions indicate that an action is scheduled;
  within some of said rule entries, utilizing a plurality of variables, wherein each variable corresponds to a characteristic of said entity;
  within some of said rule entries, defining specifications for assigning and combining constants and said plurality of variables;
  within some of said rule entries including pointers for directing said operation to another one of said rule entries;
  within some of said rule entries, including conditional connectors containing one or more Boolean expression that compares said specifications, said conditional connectors employing a corresponding one of said pointers referencing an associated workflow rule entry based on the outcome of said Boolean expression;
  navigating said workflow rule entries by employing said pointers based on a corresponding rule for each one of said entries and if a disposition type entry is reached, ending said navigation, wherein the value specified for said disposition type entry is assigned as the disposition of a corresponding entity; and
  defining temporary variable workflow entries each containing one of said specifications and pointers, such that during said navigating step when said temporary variable workflow is encountered, a value is assigned to said temporary variable based on the corresponding specification, wherein said temporary variable is available during subsequent navigation.

2. The method in accordance with claim 1 further comprising the step of:
  utilizing a visual interface for maintaining said workflow rules, said visual interface providing a visual representation of said workflow rules.

3. The method in accordance with claim 2 further comprising the step of converting said symbols generated by said visual interface to an entry within said workflow rule table.

4. The method in accordance with claim 2 further comprising the step of utilizing symbols as diagramming nodes, wherein a plurality of said symbols each correspond to one of said workflow rule entries.

5. The method in accordance with claim 4 further comprising the step of representing each one of said pointers within said workflow rule entries as connecting lines from one symbol to the other.

6. The method in accordance with claim 1 further comprising the step of using said specifications to define a value of said dispositions.

7. The method in accordance with claim 1 further comprising the step of defining various types of dispositions for representing workflow statuses.

8. The method in accordance with claim 7 further comprising the step of defining task type dispositions corresponding to work to be performed relating to said population of entities.

9. The method in accordance with claim 7 further comprising the step of defining alert type dispositions corresponding to an alert status relating to said population of entities.

10. The method in accordance with claim 7 further comprising the step of defining document type dispositions corresponding to documents to be generated relating to said population of entities.

11. The method in accordance with claim 7 further comprising the step of defining process type dispositions corresponding to electronic processes to be performed relating to said population of entities.

12. The method in accordance with claim 7 further comprising the step of defining a pause type disposition corresponding to an inaction status wherein said population of entities is in a waiting state.

13. The method in accordance with claim 7 further comprising the step of defining a stop type disposition corresponding to said population of entities wherein no further work is to be performed.

14. The method in accordance with claim 1 further comprising the step of defining connector workflow entries configured to be referenced by said pointers.

15. The method in accordance with claim 1 further comprising the step of establishing subroutines, said subroutines represented as a separate section of logic within said workflow rule entries referenced from multiple locations within said workflow rules, and navigating to a workflow rule entry from which it was referenced after completing navigation within said separate section of logic.

16. The method in accordance with claim 1 further comprising the steps of:
defining a set of possible event as a workflow rule entry, each event corresponding to each of said entities;
determining the status of the most recent event for each entity for which a disposition is being determined;
locating a workflow rule entry corresponding to said most recent event; and
employing a pointer within said workflow rule entry to begin said navigating step.

17. The method in accordance with claim 16 further comprising the steps of:
establishing predefined outcomes each associated with a selectable event; and
allowing an end user to select an event from said predefined outcomes.

18. The method in accordance with claim 17 further comprising the step of navigating said workflow rule entries in response to said selection of an event by said end user.

19. The method in accordance with claim 18 further comprising the step of ordering the presentation of a list of said predefined outcomes based on the order that events associated with the outcomes are referenced in said workflow rule entries.

20. The method in accordance with claim 18 further comprising the step of defining other-events workflow rule entry allowing an end user to select any valid event defined as a workflow rule.

21. The method in accordance with claim 16 further comprising the steps of:
defining event attributes so as to receive a request for information relating to an event in the workflow from an end-user interface;
requiring said end user to supply said information corresponding to said attributes.

22. The method in accordance with claim 21, wherein said event attribute is a waiting period specified by an end user; said wait period provided as a variable value employed in said specifications of said workflow rule entries.

23. The method in accordance with claim 16 further comprising the step of computing elapsed time since occurrence of various events to be used within said specifications.

24. The method in accordance with step 16, further comprising a step of adding at least one event qualifier so as to delineate said events into desired sub-groups.

25. The method in accordance with step 24 further comprising the step of accepting a plurality of tasks initiated by external entities, each of said tasks corresponding to an Inquiry.

26. The method in accordance with claim 24 further comprising the step of providing a selection of event qualifiers, wherein at least one of them is selected in response to an occurrence of an event.

27. The method in accordance with claim 1 further comprising the step of defining a plurality of tracks relative to said population of entities, so as to allow concurrent activities to be scheduled for performance on an entity.

28. The method in accordance with claim 27 further comprising the step of:
activating separate tracks based on specifications.

29. The method in accordance with claim 1 further comprising the step of said conditional connectors employing one of said pointers referencing an associated workflow rule entry when a result of said Boolean expression is met and employing a different one of said pointers referencing an associated workflow rule entry when said result is not met.

30. The method in accordance with claim 1 wherein said navigating step continues until a disposition is reached.

31. The method in accordance with claim 1 wherein each of said entities include a corresponding disposition.

32. A method for conducting a plurality of tasks defined by a workflow management method as claimed in claim 1.

33. The method in accordance with claim 1 wherein said navigating step continues until a disposition is reached.

34. The method in accordance with claim 1 wherein said actions is selected from the group consisting of manual work, letter generation and email generation.

35. The method in accordance with claim 1 further comprising the step of adding at least one disposition qualifier so as to delineate said workflow population into desired sub-groups.

36. The method in accordance with claim 35, further comprising the step of using said specifications to define values of said disposition qualifiers.

37. A workflow management process, said process comprising the steps of:
storing a plurality of workflow rule entries for determining dispositions of a population of entities wherein said dispositions correspond to a status of an entity among said population of entities, wherein at least some of said dispositions indicate that an action is scheduled;
within some of said rule entries, utilizing a plurality of variables, wherein each variable corresponds to a characteristic of said entity;
within some of said rule entries, defining specifications for assigning and combining constants and said plurality of variables;
within some of said rule entries including pointers for directing said operation to another one of said rule entries;
within some of said rule entries, including conditional connectors containing one or more Boolean expression that compares said specifications, said conditional connectors employing a corresponding one of said pointers referencing an associated workflow rule entry based on the outcome of said Boolean expression;
navigating said workflow rule entries by employing said pointers based on a corresponding rule for each one of said entries and if a disposition type entry is reached, ending said navigation, wherein the value specified for said disposition type entry is assigned as the disposition of a corresponding entity;
establishing a plurality of tracks relative to an entity among said entities;
defining dispositions relative to said entity specific to said established tracks so as to allow multiple concurrent activities to be scheduled to be performed relative to said entity; and
defining an attribute within each corresponding workflow rule entry said attribute identifying a track said workflow rule entry belongs.

38. The method in accordance with claim 35 further comprising the steps of:
defining a track pointer workflow entry enabling initiation of an activity in a separate track during said navigation step.

39. The method in accordance with claim 38 further comprising the step of defining a track connector workflow rule entry referenced by a pointer contained within said track pointer workflow entry.

40. The method in accordance with claim 39 further comprising the step of said track connector workflow rule entry containing a weight attribute designating a priority for said track connector workflow rule entry, to determine which workflow rule entry takes priority within a track when navigation occurs to multiple workflow rule entries as a result of one or more track connectors.

41. A workflow management process, said process comprising the steps of:

storing a plurality of workflow rule entries for determining dispositions of a population of entities wherein said dispositions correspond to a status of an entity among said population of entities, wherein at least some of said dispositions indicate that an action is scheduled;

within some of said rule entries, utilizing a plurality of variables, wherein each variable corresponds to a characteristic of said entity;

within some of said rule entries, defining specifications for assigning and combining constants and said plurality of variables;

within some of said rule entries including pointers for directing said operation to another one of said rule entries;

within some of said rule entries, including conditional connectors containing one or more Boolean expression that compares said specifications, said conditional connectors employing a corresponding one of said pointers referencing an associated workflow rule entry based on the outcome of said Boolean expression;

navigating said workflow rule entries by employing said pointers based on a corresponding rule for each one of said entries and if a disposition type entry is reached, ending said navigation, wherein the value specified for said disposition type entry is assigned as the disposition of a corresponding entity;

defining a disposition for each of said entities;

allocating a value for said defined dispositions, said value representing whether an action is scheduled;

monitoring number of entities with different active disposition values so as to measure workloads relating to said workflow management;

monitoring number of entities having inactive disposition values so as to ensure all entities are accounted for; and monitoring number of entities having inactive disposition values by type of inactivity based on value of a corresponding disposition so as to ensure reasonableness of number of entities with such disposition values.

* * * * *